United States Patent
Heredia et al.

(10) Patent No.: US 9,565,538 B2
(45) Date of Patent: Feb. 7, 2017

(54) SYSTEM AND METHOD FOR ADMINISTRATION AND OPERATION OF ONE OR MORE MOBILE ELECTRONIC COMMUNICATIONS DEVICES

(71) Applicant: Zipit Wireless, Inc., Greenville, SC (US)

(72) Inventors: Rafael Heredia, Easley, SC (US); Michael W. Crowe, Clover, SC (US); Frank U. Greer, IV, Greenville, SC (US); Joseph A. Ellis, Greenville, SC (US); Jordan Upham, Pendleton, SC (US); William R. Matson, Greer, SC (US)

(73) Assignee: Zipit Wireless, Inc., Greenville, SC (US)

(*) Notice: Subject to any disclaimer, the term of this patent is extended or adjusted under 35 U.S.C. 154(b) by 0 days.

(21) Appl. No.: 14/829,379

(22) Filed: Aug. 18, 2015

(65) Prior Publication Data

US 2015/0358821 A1    Dec. 10, 2015

Related U.S. Application Data

(62) Division of application No. 13/703,866, filed as application No. PCT/US2010/062280 on Dec. 28, 2010, now Pat. No. 9,131,356.

(Continued)

(51) Int. Cl.
*H04M 1/66* (2006.01)
*H04W 4/14* (2009.01)
(Continued)

(52) U.S. Cl.
CPC .......... *H04W 4/14* (2013.01); *G06F 17/30073* (2013.01); *H04B 1/401* (2013.01);
(Continued)

(58) Field of Classification Search
CPC ................... H04M 1/72533; H04N 2201/3216
(Continued)

(56) References Cited

U.S. PATENT DOCUMENTS 4,356,946 A    11/1982    Gaskell
5,596,318 A    1/1997    Mitchell
(Continued)

OTHER PUBLICATIONS

Wildpackets, Inc.; Converting Signal Strength Percentage to dBm Values; Nov. 2002; 11 Pages; www.wildpackets.com; Walnut Creek, CA, USA.

(Continued)

*Primary Examiner* — Kiet Doan
(74) *Attorney, Agent, or Firm* — Maginot, Moore & Beck, LLP

(57) ABSTRACT

A system for managing mobile electronic communications devices includes a user directory database configured to hold authentication data associated with at least one user, an authentication authority communicatively connected to the user directory database, an administration server configured to send and receive command messages with at least one mobile electronic communications device, a messaging server configured to send and receive communications messages with at least one mobile electronic communications device, and the authentication authority, administration server, and messaging server are configured to send and receive data via a data communications network. The authentication authority accepts or denies authentication data for a user received from at least one mobile electronic communications device, stores status information corresponding to authenticated users in the user directory database, and stores an association between each authenticated user and each mobile electronic device that sent authentication data for an authenticated user in the user directory database.

14 Claims, 17 Drawing Sheets

Related U.S. Application Data

(60) Provisional application No. 61/326,716, filed on Apr. 22, 2010.

(51) Int. Cl.

| | | |
|---|---|---|
| *H04L 12/58* | (2006.01) | |
| *H04W 4/12* | (2009.01) | |
| *H04W 48/18* | (2009.01) | |
| *G06F 17/30* | (2006.01) | |
| *H04B 1/401* | (2015.01) | |
| *H04W 12/06* | (2009.01) | |
| *H04M 1/67* | (2006.01) | |
| *H04M 1/725* | (2006.01) | |
| *H04W 4/00* | (2009.01) | |
| *H04W 4/02* | (2009.01) | |
| *H04W 88/06* | (2009.01) | |
| *H04L 29/08* | (2006.01) | |

(52) U.S. Cl.
CPC .......... *H04L 12/5895* (2013.01); *H04L 51/38* (2013.01); *H04W 4/12* (2013.01); *H04W 12/06* (2013.01); *H04W 48/18* (2013.01); *H04L 67/26* (2013.01); *H04L 67/322* (2013.01); *H04M 1/67* (2013.01); *H04M 1/72572* (2013.01); *H04M 2250/06* (2013.01); *H04W 4/001* (2013.01); *H04W 4/02* (2013.01); *H04W 4/021* (2013.01); *H04W 88/06* (2013.01)

(58) Field of Classification Search
USPC ........ 455/41.2, 66.1, 411, 418, 456.6, 422.1, 455/432.1; 713/170, 186; 370/328; 358/402, 1.15, 400; 379/100.08
See application file for complete search history.

(56) References Cited

U.S. PATENT DOCUMENTS

| | | | |
|---|---|---|---|
| 5,745,689 A | 4/1998 | Yeager et al. | |
| 5,894,506 A | 4/1999 | Pinter | |
| 6,118,979 A | 9/2000 | Powell | |
| 6,243,581 B1 | 6/2001 | Jawanda | |
| 7,065,367 B2 | 6/2006 | Michaelis et al. | |
| 7,089,033 B2 | 8/2006 | Leinonen et al. | |
| 7,149,521 B2 | 12/2006 | Sundar et al. | |
| 7,185,059 B2 | 2/2007 | Daniell et al. | |
| 7,215,959 B2 | 5/2007 | Creamer et al. | |
| 7,230,533 B2 | 6/2007 | Hamolsky | |
| 7,254,119 B2 | 8/2007 | Jiang et al. | |
| 7,275,215 B2 | 9/2007 | Werndorfer et al. | |
| 7,363,378 B2 | 4/2008 | Holmes et al. | |
| 7,386,588 B2 | 6/2008 | Mousseau et al. | |
| 7,406,324 B1 | 7/2008 | McConnell | |
| 7,428,585 B1 | 9/2008 | Owens, II et al. | |
| 7,450,936 B2 | 11/2008 | Kim | |
| 7,484,176 B2 | 1/2009 | Blattner et al. | |
| 7,499,432 B2 | 3/2009 | Guo et al. | |
| 7,505,571 B2 | 3/2009 | Bhatia et al. | |
| 7,519,364 B2 | 4/2009 | Nair et al. | |
| 7,606,866 B2 | 10/2009 | Mora | |
| 7,627,679 B1 | 12/2009 | Bowen et al. | |
| 7,630,723 B2 | 12/2009 | Vargas | |
| 7,640,336 B1 | 12/2009 | Lu et al. | |
| 7,653,398 B2 | 1/2010 | Buckley et al. | |
| 7,675,903 B2 | 3/2010 | Ozugur et al. | |
| 7,739,367 B2 | 6/2010 | Ding | |
| 7,835,736 B2 | 11/2010 | Larocca | |
| 7,853,652 B2 | 12/2010 | McCarty | |
| 7,853,668 B2 | 12/2010 | Daniell et al. | |
| 7,886,232 B2 | 2/2011 | Fish | |
| 7,908,327 B2 | 3/2011 | Kucharewski et al. | |
| 8,027,335 B2 | 9/2011 | Ansari et al. | |
| 8,223,938 B2 | 7/2012 | Cassanova et al. | |
| 8,280,978 B2 | 10/2012 | Ansari et al. | |
| 2002/0085516 A1 | 7/2002 | Bridgelall | |
| 2002/0091783 A1 | 7/2002 | Garland et al. | |
| 2003/0055953 A1 | 3/2003 | Motoyama et al. | |
| 2003/0117280 A1 | 6/2003 | Prehn | |
| 2003/0134636 A1 | 7/2003 | Sundar et al. | |
| 2003/0193910 A1 | 10/2003 | Shoaib et al. | |
| 2003/0210265 A1 | 11/2003 | Haimberg | |
| 2003/0228866 A1* | 12/2003 | Pezeshki ................ H04L 67/04 455/422.1 |
| 2004/0090937 A1 | 5/2004 | Chaskar et al. | |
| 2004/0104808 A1 | 6/2004 | Khoshbin | |
| 2004/0127210 A1 | 7/2004 | Shostak | |
| 2005/0271018 A1 | 12/2005 | Liu et al. | |
| 2006/0031504 A1 | 2/2006 | Hegli et al. | |
| 2006/0063563 A1 | 3/2006 | Kaufman | |
| 2006/0068777 A1 | 3/2006 | Sadowsky et al. | |
| 2006/0101116 A1 | 5/2006 | Rittman et al. | |
| 2006/0114874 A1 | 6/2006 | Terry | |
| 2006/0253584 A1 | 11/2006 | Dixon et al. | |
| 2006/0262231 A1 | 11/2006 | Chang | |
| 2006/0277590 A1 | 12/2006 | Limont et al. | |
| 2006/0284787 A1 | 12/2006 | Bear et al. | |
| 2007/0019100 A1 | 1/2007 | Mitani et al. | |
| 2007/0037547 A1 | 2/2007 | Cheol | |
| 2007/0077924 A1* | 4/2007 | Bhogal ............ H04M 1/72522 455/420 |
| 2007/0130255 A1 | 6/2007 | Wolovitz et al. | |
| 2007/0171936 A1 | 7/2007 | Hazra et al. | |
| 2007/0178881 A1 | 8/2007 | Teunissen et al. | |
| 2007/0178895 A1 | 8/2007 | Bot | |
| 2007/0180100 A1 | 8/2007 | Biggs et al. | |
| 2008/0091781 A1 | 4/2008 | Haruna et al. | |
| 2008/0130598 A1 | 6/2008 | Kalhan | |
| 2008/0151851 A1 | 6/2008 | Sitch | |
| 2008/0198818 A1 | 8/2008 | Montemurro et al. | |
| 2008/0235240 A1 | 9/2008 | Vaid et al. | |
| 2008/0282155 A1 | 11/2008 | Kempanna | |
| 2009/0023410 A1 | 1/2009 | Ghosh | |
| 2009/0091425 A1 | 4/2009 | Sharpe | |
| 2009/0109898 A1 | 4/2009 | Adams et al. | |
| 2009/0180429 A1 | 7/2009 | Stevens et al. | |
| 2009/0207817 A1 | 8/2009 | Montemurro et al. | |
| 2009/0286542 A1 | 11/2009 | Roberts et al. | |
| 2009/0310586 A1 | 12/2009 | Shatti | |
| 2010/0169010 A1 | 7/2010 | Jeong | |
| 2010/0190473 A1* | 7/2010 | Ishikawa ................ H04W 8/24 455/411 |
| 2010/0273449 A1 | 10/2010 | Kaplan | |
| 2010/0279675 A1 | 11/2010 | Slack et al. | |

OTHER PUBLICATIONS

Mobile Connect, Connecting a Mobile Workforce; Amcom Software, Inc.; 2010; 2 Pages.

International Search Report and Written Opinion of the International Searching Authority corresponding to PCT Application No. PCT/US2010/062280, Korean Intellectual Property Office, Sep. 30, 2011 (9 pages).

Hildebrand et al.; XEP-0138: Stream Compression; XMPP Standards Foundation; May 27, 2009; 9 Pages; http://xmpp.org/extensions/xep-0138.html.

Peter Saint-Andre; Extensible Messaging and Presence Protocol (XMPP): Core; Internet Official Protocol Standards; Oct. 2004; 66 Pages; http://xmpp.org/rfcs/rfc3920.html.

Peter Saint-Andre; Extensible Messaging and Presence Protocol (XMPP): Instant Messaging and Presence; Internet Official Protocol Standards; Oct. 2004; 81 Pages; http://xmpp.org/rfcs/rfc3921.html.

Osborne et al.; RVP: A Presence and Instant Messaging Protocol; Microsoft Corporation; 38 Pages; https://tools.ietf.org/html/draft-osborne-rvp-00.

Yawelak et al.; IPoIM: Internet Protocol over Instant Messaging; Military Communications Conference, 2006; pp. 1-7.

(56) References Cited

OTHER PUBLICATIONS

Hu et al; Blocking MSN: A Case Study of Preventing the Abuse of IM; Asia-Pacific Conference on Communications; Oct. 3-5, 2005; pp. 1112-1116; Perth, Western Australia.

* cited by examiner

SYSTEM AND METHOD FOR ADMINISTRATION AND OPERATION OF ONE OR MORE MOBILE ELECTRONIC COMMUNICATIONS DEVICES

PRIORITY CLAIM

This applications is a divisional application of and claims priority from pending U.S. patent application Ser. No. 13/703,866, which is entitled "System And Method For Administration And Operation Of One Or More Mobile Electronic Communications Devices," which was filed on Dec. 12, 2012, and which issued as U.S. Pat. No. 9,131,356, which is a section 371 application of International Application s/n PCT/US2010/062280 that was revived by petition on Jan. 29, 2013, which is entitled "System And Method For Administration And Operation Of One Or More Mobile Electronic Communications Devices," which was filed on Dec. 28, 2010, which was a continuation application of U.S. Provisional Application No. 61/326,716, which is entitled "System And Method For Administration And Operation Of One Or More Mobile Electronic Communications Devices" and was filed on Apr. 22, 2010.

TECHNICAL FIELD

This disclosure relates to wireless communications systems and, more particularly, to management and operation of a network of wireless devices used for two-way text communications within an enterprise.

BACKGROUND

Mobile electronic communications devices including pagers, cellular telephones (cell phones), and devices capable of both data and voice communications, sometimes referred to as "smartphones," each provide different forms of electronic communications. Pager networks generally allow for very simple messages or numeric pages to be sent to a small device known as a pager or beeper. The pager devices are viewed as simple devices because they often are only capable of displaying a callback phone number or brief text message. Some pagers have "two-way" functionality that permits them to send simple messages and respond to incoming pages. Cell phones are also well known, and enable two-way duplex voice communications between the cell phones and landline telephones and other cellular telephones. Cellular telephones may also have limited data transmission capability including the ability to send short text messages using, for example, the Simple Messaging System (SMS). Smartphones are an advanced form of cell phones that provide access to both the standard telephony features of a cell phone and to various forms of data communications that occur over the World Wide Web via a web browser, instant messaging application program, and/or email program. Smartphones often provide access to data networks that were previously reserved for larger electronic devices, such as desktop or notebook computers.

While mobile electronic devices have become ubiquitous in modern society, the devices that are currently available have drawbacks as well. Pagers are very simple to use, but existing pager networks are presently being phased out of use as enterprises increasingly desire the enhanced abilities available through smartphones and the like. While cellular telephones, and smartphones in particular, enhance the data exchanging capabilities in a communication network, they too have drawbacks. Cellular phones are most useful for voice communications between a small group of individuals, but become less useful when sending messages to a larger number of devices. While data protocols like SMS can approximate the alphanumeric functionality of a pager, centrally tracking large numbers of SMS messages to individual mobile devices, and determining if a message has actually been displayed on the mobile device to which it was sent, is not possible in current systems without the use of special software on both the device and another computer. Wireless service providers who provide SMS message services also cannot guarantee the delivery times for SMS communications to the mobile devices. While smartphones are able to communicate using a variety of network protocols, the complex functionality of smartphones may provide too many unused capabilities at prices that render them too inefficient in time-constrained environments, such as a workplace.

Other problems with cellular telephones and smartphones include the limited options in centrally controlling and viewing the contents of communications between these devices. For example, an administrator in a hospital cannot read the content of an SMS message sent by Dr. A to Dr. B, or determine if Dr. B received and read the message. Cell phones and smartphones are also often capable of storing large amounts of information. If a cell phone or smartphone is lost or stolen, much of this information is irretrievably lost or becomes available for nefarious purposes.

The problems with current technologies noted above are particularly acute in situations where a defined group of users need a reliable and simple communications system using mobile electronic devices. Medical professionals, including doctors, nurses, and other support personnel, working together in a hospital are one such example. Other examples include public agencies, such as police and fire departments. Many of these organizations still rely on pagers because of their simplicity, and because pager networks have historically had improved functionality over alternative mobile communications devices within buildings. For example, while modern cellular networks have broad geographic coverage, these networks still have difficulty in sending and receiving signals with devices within shielded structures, such as hospitals and police and fire stations. In the past, pager networks had improved coverage in these structures because of the very low bandwidth requirements of pagers, and because most pagers only received transmissions from the pager network and did not need to transmit back to the network. Pagers also provide a broadcast functionality, allowing for "one-to-many" communications where a single message is broadcast to many pagers simultaneously. In contrast, cellular phone systems generally send messages on a slower sequential basis, with one message sent to one recipient cell phone at a time. Despite these pager system advantages, the limitations in pager functionality in view of other more robust data exchanging devices render existing pager systems less useful for some modern professionals.

The drawbacks of current mobile communications devices and networks described above limit the use of these devices. A mobile electronic device communications system that allows for complex messaging and communications while providing improved reliability and security in shielded buildings is desired.

SUMMARY

A mobile electronic communications device includes a housing, a memory, a data entry mechanism, a display for visual data, at least one wireless transceiver, the at least one wireless transceiver configured to transmit and receive electromagnetic signals conforming to a plurality of wireless signaling protocols, and a controller. The controller is communicatively connected to the memory, data entry mechanism, and display; and is configured to send and receive data using the at least one wireless transceiver. The controller is additionally configured to detect available wireless networks that the at least one wireless transceiver is able to send and receive data from using at least one of the plurality of wireless signaling protocols, detect available wireless networks the at least one wireless transceiver is able to send and receive data from using at least one of the plurality of wireless signaling protocols, compare network identifications of available wireless networks to a predetermined list of network identifications ordered by preference, establish a wireless network connection with an available wireless network having a network identification corresponding to a most preferred network identification in the predetermined list of network identifications for which a wireless network is available, and execute an authentication process in response to establishing the wireless network connection.

A system for managing mobile electronic communications devices includes a user directory database configured to hold authentication data associated with at least one user, an authentication authority communicatively connected to the user directory database, an administration server configured to send and receive command messages with one or more mobile electronic communications devices, and a messaging server configured to send and receive messages with at least one mobile electronic communications device. The authentication authority configured to accept or deny authentication data for a user received from at least one mobile electronic communications device, to record the status of authenticated users in the user directory database, and to store an association between each authenticated user and each mobile electronic device that sent authentication data for the authenticated user in the user directory database. The authentication authority, administration server, and messaging server are configured to send and receive data via a data communications network.

An application program stored on a computer readable medium instructs a controller in a two-way electronic communications device to enable one of a first wireless transceiver and a second wireless transceiver for data communication and to disable the other of the first wireless transceiver and the second wireless transceiver for data communication in response to a detected network identifier obtained without user interaction.

A method for delivering data from a first network computing device to a subscriber computing device includes establishing at least one publisher node in a network computing device, configuring a subscriber computing device with a subscription to the at least one publisher node, generating a data message for publication by the at least one publisher node, transmitting the data message from the at least one publisher node to the subscriber computing device with the subscription, generating a receipt message in the subscriber computing device that corresponds to the data message, and transmitting the receipt message from the subscriber computing device to the network computing device.

BRIEF DESCRIPTION OF THE DRAWINGS

FIG. 8 is a flow diagram of a method for selecting a wireless network to establish a network connection with.

DETAILED DESCRIPTION

Figure 1:
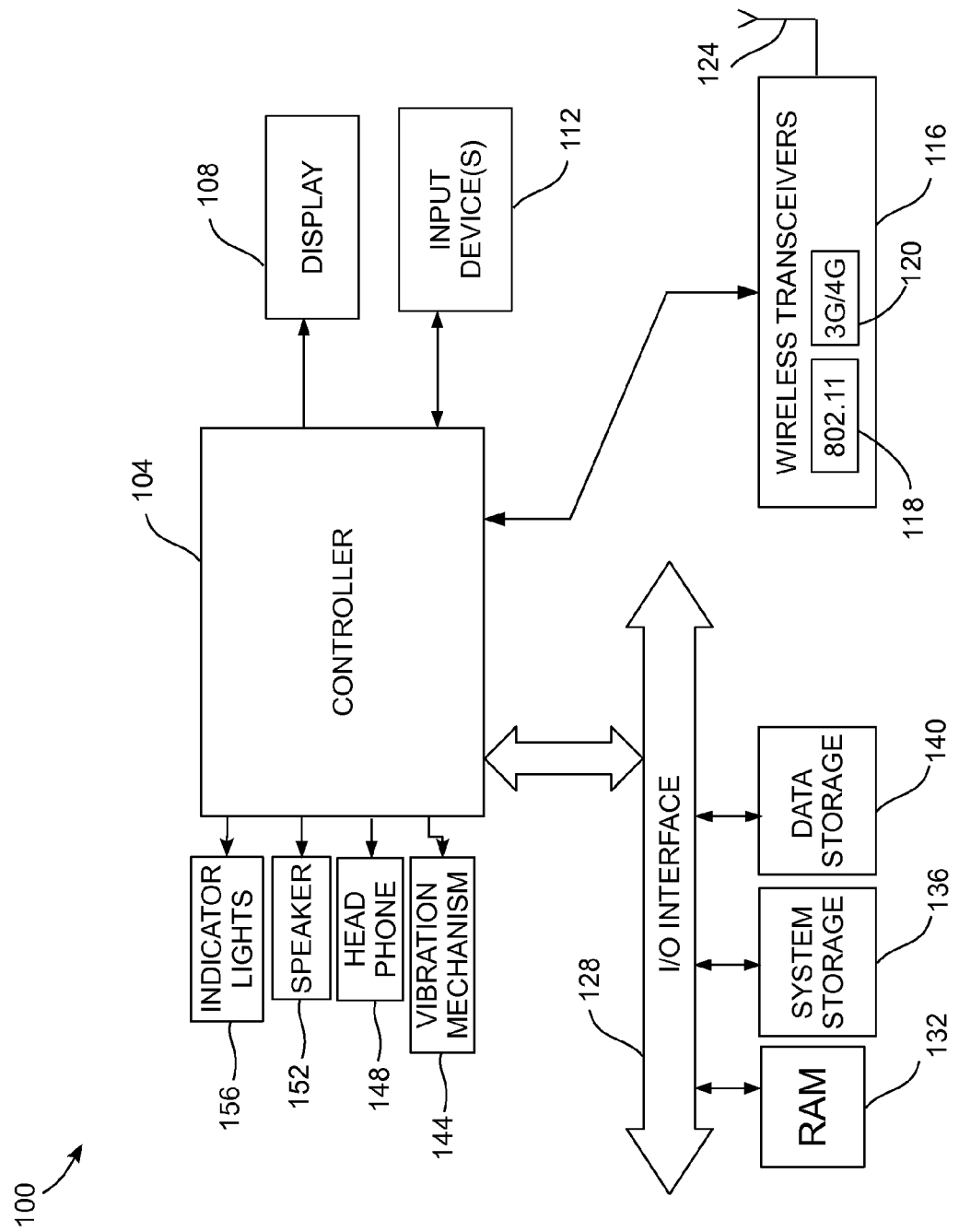
FIG. 1 is a schematic block diagram of a mobile electronic communications device.

For the purposes of promoting an understanding of the principles of the embodiments disclosed herein, reference is now made to the drawings and descriptions in the following written specification. The term "mobile electronic communications device," refers to a range of hand-held or otherwise portable electronic devices that facilitate communication by sending data or voice signals through data networks. As used herein, a "mobile messenger" is a type of mobile electronic communications device embodying the features disclosed herein.

The term "controller" as used herein refers to an electronic control unit, typically including a microprocessor, but may include any such control capable device such as an ASIC, FPGA, a general purpose CPU, such as a CPU from the ARM family or x86 family, or any data processing device adapted to send and receive data, and to control the operations of the mobile messenger. The term "data storage" refers to any device capable of storing and retrieving digital information in a manner that may be used by the controller. Common examples include, but are not limited to, Dynamic Random Access Memory (DRAM), and Static Random Access Memory (SRAM). The term also includes any non-volatile data storage devices that are capable of retaining digital information if electrical power is removed from any of the controller or memory. Such devices include magnetic hard drives, solid-state storage devices including NAND or NOR flash memory, optical data storage devices, or any device capable of retaining digital data in the absence of an electrical power source. The controller operates the mobile messenger in accordance with one or more software programs that are read from a data storage device in the mobile messenger.

As used herein, the term "configure" refers to an operation of a computing device including mobile electronic communications devices whereby the computing device stores programmed instructions and/or parametric data in a computer readable media, such as a volatile or non-volatile memory, hard drive, solid state drive, or the like. The programmed instructions are executed by various processors, including a controller in a mobile electronic communications device and one or more processors in a server to perform a function or task. Parametric data, also referred to as configuration data, include any stored data that the programmed instructions refer to during performance of the functions and tasks. Examples include, but are not limited to, user authentication data, directory information, and lists of wireless access points. A configured computing device executes the stored program instructions, and the program instructions may reference stored parametric data during execution.

Mobile electronic communications devices may include wireless transceivers, where a "wireless transceiver" is any device capable of transmitting and receiving information via electromagnetic signals that do not require a physical cable or connection for propagation. Common examples include radio, microwave, infra-red, laser, and optical transceivers. The term "wireless network" as used herein describes any arrangement of two or more electronic devices capable of sending and receiving data where at least one device uses a wireless transceiver to send and receive data. Common examples of wireless technologies often used over broad geographic areas include cellular networks, 3G, 4G, and other wireless wide-area network (WWAN) technologies. Other examples of wireless networks for use within narrower geographic areas include wireless local-area networks (WLAN). WLAN technologies include devices using the IEEE 802.11 series of protocols including "Wi-Fi" branded devices, devices linked via Bluetooth, or devices that exchange information using optical or infra-red signaling. A wireless network may also include two or more devices equipped with wireless transceivers that communicate with each other directly instead of using an intermediate data network. Common examples of these networks include point-to-point communications using infrared transceivers, paired Bluetooth radio transceivers, and ad-hoc 802.11 networks.

Various types of messages may be sent using a WWAN or WLAN including "communications messages" and "command messages". A communications message may be any form of digital data that may be sent between the mobile messengers as discrete messages. Communications messages include, but are not limited to, text messages including optional metadata to provide formatting such as font and color metadata, emails, photographs, audio messages, video messages, and numeric pages. Communications messages may also have a variety metadata, including the sender and recipient of the message, the time when the message was sent and received, priority information, one or more predetermined responses that recipients may send when responding to the message, and status information indicating whether or not the message has been read. A communications message may organize message data and metadata using a structured format, including identifying message data and metadata in a structured format such as extensible markup language (XML). A command message includes one or more instructions for a recipient device to execute. In one configuration, a mobile messenger receives command messages and is configured to take various actions in response to the contents of the command message. Command messages may also convey configuration information, software updates, and other data used to operate the recipient device.

The terms "gateway" and "portal" as used interchangeably herein to refer to a computing server that is operatively connected to a computing device, often referred to as a "backend" computing device, and to a network. The gateway provides a translation service that enables one or more client computing devices that are operatively connected to the network to access the backend computing device. A web gateway or web portal is an example of a gateway that enables client computing devices to access the backend service using a web browser. Alternative gateways enable clients using different communications methods such as email, simple messaging service (SMS), secure shell (SSH), telnet, web services, and the like to access the backend computing device. Gateways and portals may be configured to enable clients to send commands to control the backend computing device, and to receive data from the backend computing device.

A schematic block diagram of an example of an improved mobile messenger 100 is depicted in FIG. 1. A controller 104 is communicatively connected to a display 108, one or more input devices 112, one or more wireless transceivers 116, an input/output (I/O) interface 128 for reading and writing data, a speaker 152, headphone jack 148, and vibration mechanism 144. Display 108 is typically a screen small enough to be housed within a hand-held mobile electronic device. Display 108 may be capable of displaying text and graphics in color as well as monochrome, and may also be configured to emit light to make the display contents visible when there is little or no ambient light around the device. Display 108 outputs text or graphical data in response to signals generated by the controller 104. At least one input device 112 within the mobile messenger 100 permits the user to communicate with and send commands to the controller 104. The input device may include a physical key input such as a numeric keypad or a QWERTY keyboard. Other input devices include touch pads, joystick devices, and trackballs. The display 108 may be configured as touch-screen input device enabling a user to send input to the controller by touching the screen with one or more digits or a stylus. An aural input device may also be used, including a microphone to record spoken commands. Any compatible input device encodes input data in an electronic format capable of being decoded by the controller 104. Various customization settings enable a user of mobile messenger 100 to alter the appearance of messages shown in display 108 and to customize the operation of mobile messenger 100. Such customizations include changing the colors and sizes of fonts for communications messages shown in display 108, selecting themes for various elements of the graphical display, and in selecting alternative alert sounds.

Controller 104 is also connected to one or more wireless transceivers 116 that are capable of selecting between at least two wireless signaling protocols. The transceivers 116 permit controller 104 to send and receive data over different wireless networks, and also permit controller 104 to receive command messages sent from another device or server connected to one of the wireless networks. Controller 104 is additionally configured to implement a compressor and decompressor to compress and decompress data sent and received via the transceivers 116. The compressor and decompressor may be implemented in software read from system storage 136 and executed by the controller 104, or may be implemented as hardware circuits in the controller 104. The compressor is configured to compress seed data read from the system storage 136 prior to compressing network data, and the decompressor may optionally decompress the compressed seed data prior to receiving compressed network data. The compressor compresses data that is transmitted using the wireless transceivers 116, and the decompressor decompresses previously compressed data received from a control system and other computing devices via the network wireless transceivers 116. Two examples of compression techniques suitable for the compressor and decompressor are the DEFLATE and LZW techniques, although other compression and decompression techniques may be used.

In various embodiments, a mobile messenger may use two or more wireless transceiver modules, with each module configured to use a separate communications protocol. These protocols may use different operating frequencies and modulation schemes. In the example of transceivers 116, one transceiver module 118 is configured to operate using WLAN networks employing the IEEE 802.11 family of protocols, while another modular transceiver 120 supports WWAN networks, such as a 3G or 4G network. Examples of 3G data networks include EV-DO and UMTS, while examples of 4G data networks include LTE and WiMAX. Upon establishing a connection with either a WLAN or WWAN, the controller is assigned a network address, typically an Internet Protocol (IP) address using either version 4 (IPv4) or version 6 (IPv6) of the IP standard. Alternative embodiments to wireless transceivers 116 could use software-defined radio systems to enable a single physical transceiver to operate with different frequency bands using different signaling protocols. For example, a single physical transceiver using a software-defined scheme could switch between operation in 802.11 mode or WWAN mode in response to commands sent from the controller 104. The transceivers 116 are electrically connected to an antenna 124. In order to save space in the mobile messenger 100, a single antenna 124 may be configured to be compatible with both the 802.11 transceiver 118 and WWAN transceiver 120. However, alternative devices may employ multiple antennae adapted for use with one or more transceivers. Antenna 124 may be replaced by a light-emitter and lenses for alternative transceivers that operate in the infra-red or optical portion of the electromagnetic spectrum.

Continuing to refer to FIG. 1, controller 104 is communicatively coupled to a data input-output (I/O) interface 128. In mobile messenger 100, the I/O interface 128 is a shared electronic bus that operationally connects controller 104 to random access memory (RAM) 132, a data storage device holding operating software 136, and a digital storage device holding message and user data 140. Alternative I/O interfaces may include point-to-point or switched I/O schemes to facilitate communication between controller 104 and one or more memory and storage devices. RAM 132 holds command instructions and operating data used by controller 104 during normal operations. RAM 132 is typically volatile, meaning that when electrical power is removed from the device, the contents of data held in the RAM are erased.

System storage 136 holds the stores machine readable instructions for one or more programs that controller 104 may read to receive instructions used for various operations of mobile messenger 100. In some embodiments, system storage 136 may also hold operating instructions use to configure other system components including the wireless transceivers 116. The system storage 136 is typically stored in a non-volatile storage device such as a NAND or NOR flash device, allowing the instruction codes held in system storage 136 to be re-read after electrical power is removed from the mobile messenger 100. The data contents of system storage 136 may be referred to as "firmware" because they are not supposed to be altered during normal operation, but may be updated periodically to allow for updates to the operating commands used in the mobile messenger 100. Data storage device 140 stores sent and received communications messages and other user information used by mobile messenger 100. User information includes user customization settings that are stored in an XML data record format in the embodiment of FIG. 1. Data storage device 140 allows for access to previously received communications messages without the need to retransmit those messages over a wireless network. Like system storage device 136, data storage device 140 is typically a non-volatile device for the long-term retention of user data. However, the data storage 140 is configured to have stored data read, written, and erased by controller 104 during normal use of the mobile messenger 100. The data storage device 140 and system storage device 136 may optionally be placed in logically separated areas of a single physical device.

Controller 104 is optionally connected to one or more audio, visual, or vibrational indicator devices. These devices may emit sounds, produce vibrations, or provide visual cues providing feedback to the user about the status of the device. Audio outputs including a built-in speaker 152 and head phone output 148 may provide audible alerts when a new message is received, and may be configured to play back audio messages. Audio outputs may have an adjustable volume level that may change in response to control signals sent by controller 104. A vibration mechanism 144, may vibrate in addition to, or instead of, an audible alert sounding. Common vibrational mechanisms employ a small electrical motor with a rotating axle connected to a weight that is shifted off-center of the rotational axis of the axle. One or more indicator lights 156 may also activate or blink in a pattern to communicate device status. The lights may be of different colors to provide more information. For example, a red light may indicate a high-priority message has been received, while a green light may indicate a normal-priority message has been received.

In operation, mobile messenger 100 is configured to establish a connection to an available wireless network using either the WLAN network transceiver 118 or WWAN network transceiver 120. In situations where multiple wireless networks are available, controller 104 is configured to select one of the available networks automatically based on a predetermined list of prioritized networks read from system storage 136. The mobile messenger obtains a network address from either the WLAN or WWAN, where the network address is typically an IP address. The controller is further configured to send authorization data over the wireless network, with the authorization data may include a device identifier corresponding to the mobile messenger and a username and password combination entered by the user via one of the input devices 112, such as a keyboard. If the authorization succeeds, the controller sends and receives communications messages using wireless transceivers 116.

Communications messages are sent and received from a central messaging server having a unique network address such as an IP address. Communications messages to and from other mobile messengers or other networked devices are all directed to the central messaging server prior to final message delivery. Received messages are stored in the data storage device 140 and are shown on display 108. Controller 104 is configured to send a receipt message over the wireless network connection in response to receiving a communications message. A user may read the contents of a received message on display 108, or may listen to audio messages via speaker 152 through head phone interface 148. In response to the user reading a communications message, controller 104 is further configured to send a message indicating that the communications message has been read over the wireless network. A user may also enter messages for transmission via the input devices 112. After a message is sent, the mobile messenger 100 may receive one or more status messages indicating that sent message has been received and that it has been read. Controller 104 is further configured to inform the user of the status of sent messages via the display 108.

Mobile messenger 100 is further configured to receive and take action in response to command messages that are sent over a wireless network from a central command site. Controller 104 may receive a command message instructing it to adjust the volume of audio outputs such as speaker 152 and head phone output 148. This command may be sent in order to automatically mute audio output automatically, without requiring the user to adjust the volume level manually. Conversely, a different command message may instruct controller 104 to adjust the audio output to a higher volume level and output an alarm sound. This operational mode is useful when a mobile messenger is misplaced and an alarm sounds to help locate the device. The controller may override the pre-set audio volume level to ensure that an alarm is audible. A related command message may instruct the controller 104 to lock the mobile messenger. Unlike a user-lock that requires the user to enter a code to unlock the device, the device may be enabled for use only by another command message generated by an administrator using the control system. Still another command message instructs controller 104 to delete the contents of data storage device 140. This command is useful if mobile messenger 100 is lost, stolen, or is to be reset in order to eliminate the contents of any potentially sensitive communications from data storage device 140. This command also deletes any stored authentication data such as username and password information, preventing unauthorized users from sending or receiving messages with mobile messenger 100. Another type of command from a central control site may include command messages that instruct the controller of the receiving device to enable or disable one or more of the wireless transceivers in the receiving device.

Figure 2:
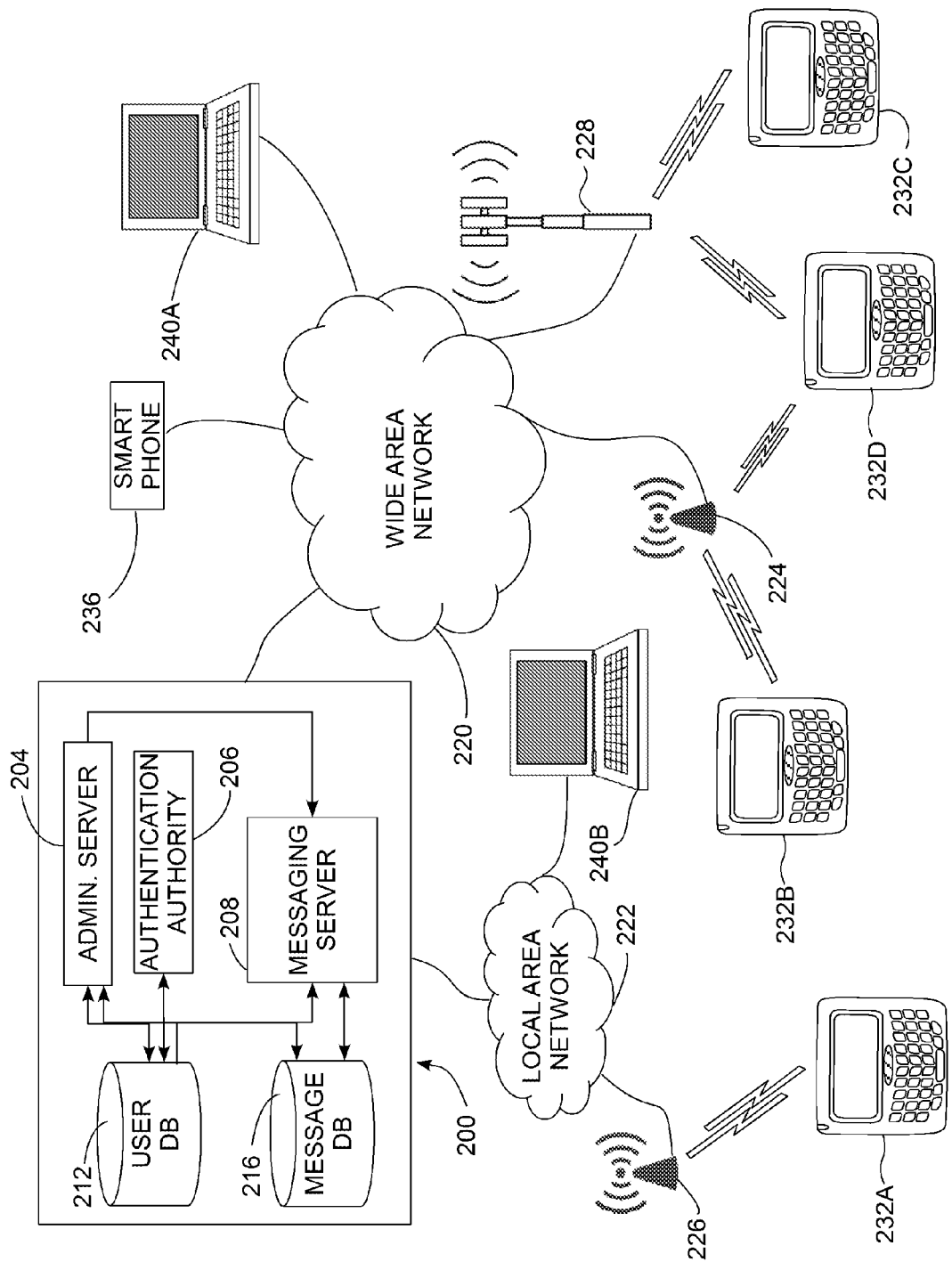
FIG. 2 is a diagram depicting a control system and communications networks suitable for use with the mobile electronic communications device of FIG. 1.

A control system 200 suitable for administering one or more of the mobile messengers described in FIG. 1 is shown in FIG. 2. Control system 200 includes an administration server 204, authentication authority 206, messaging server 208, user database 212 (abbreviated as DB in FIG. 2), and message database 216. Administration server 204 is configured to read and write data from user database 212, message database 216. The server 204 is further configured to send communications message data to messaging server 208, to send command messages to one or more mobile messengers 232A-232D, and to send and receive administration data with a remote administration host 240A and 240B. Authentication authority 206 is configured to read user identity and authentication data from user database 212, and to update user database 212 with status information of whether a user is authenticated and actively connected to the control system 200. Messaging server 208 is configured to send, receive, and store communications messages sent to or from one or more mobile messengers 232A-232D. Messaging server 208 is further configured to store communications messages in message database 216.

Control system 200 is communicatively connected to at least one data network. In FIG. 2, control system 200 is communicatively coupled to a Wide Area Network (WAN) 220 and Local Area Network (LAN) 222. WAN 220 and LAN 222 convey electronic data between control system 200 and one or more mobile messengers 232A-232D. LAN 222 may be a network combining wired Ethernet with a wireless networking technology, such as an 802.11 network. The Internet is an example of a network suited for use as a WAN. The mobile messengers access WAN 220 and LAN 222 via one or more wireless communications systems. In FIG. 2, 802.11 wireless access point 226 connects mobile messenger 232A to LAN 222, while a different 802.11 access point 224 connects mobile messengers 232B and 232D to WAN 220. A WWAN wireless tower 228 connects mobile messenger 232C to WAN 220 and control system 200. Control system 200 is configured to send and receive communications messages sent and received from the mobile messengers 232A-232D, by directing communications messages to and from the network address, typically IP addresses, associated with each mobile messenger. Control system 200 may communicate with computing systems other than mobile messengers 232A-232D. In FIG. 2, computers 240A and 240B are configured to access administrative information via administration server 204. Additionally, a third-party smartphone 236 is able to send and receive communications messages with messaging server 208. Other examples of third party devices that may exchange communications messages with control system 200 include desktop and notebook computers, telephones configured to send voice messages in a digital format including Voice over Internet Protocol (VoIP), and two-way pagers.

User database 212 and message database 216 provide a system for storing and retrieving user data and message data respectively. Each of these databases may be implemented using various data organization methods including a relational database model, object-oriented data store, flat files including comma-separated value files and the like, and hierarchical data models including records stored with an Extensible Markup Language (XML) scheme. The user database 212 stores directory information pertaining to each user of the system. This information includes authentication data such as a username and password, and status information indicating whether the user is presently using a mobile messenger that is connected to a wireless network. The user database 212 includes an identifier to associate the user with one or more mobile messengers. The identifier may be a hardware address associated with a particular mobile messenger such as a Media Access Control (MAC) address.

The user database 212 may include additional information, such as address book information having addresses of other parties with whom the user communicates. User database 212 also stores pager group records that associate multiple user addresses and device identifiers with a single paging group. A paging group refers to a predefined group of users that receive a common message or page sent by one user or administrator. The user database 212 provides address information to the messaging server 208 to enable the messaging server 208 to send messages to each user identified in the pager group record when a message is sent to the pager group. Customized user settings applicable to a particular mobile messenger device held in an XML formatted record are also stored in user database 212. The customized settings pertain to customizations applied by the user to each device, including font sizes and colors, graphical interface themes, and alerts such as custom alert sounds. The setting records are generated by each mobile messenger, and are then transmitted via either WAN 220 or LAN 200 for storage in the directory entry for the corresponding user. Message database 216 is an archive of communications messages sent and received from each of the mobile messengers. This database may include messages that have already been sent by or delivered to a recipient. Message database 216 may also hold messages that have not been sent to a mobile messenger for various reasons including the mobile messenger being out of range of a suitable wireless network. When the mobile messenger becomes available, the stored messages are automatically transmitted to the mobile messenger by messaging server 208. Message database 216 additionally holds metadata associated with each communications message. These metadata include identifiers for the party sending the message and the intended recipient, and a timestamp for when the message was stored in message database 216. Metadata further include status codes and timestamps indicating when and if a communications message was received by a mobile messenger, and whether or not the user of the mobile messenger has displayed the message.

Authentication authority 206 provides authentication and access control services for mobile messengers 232A-232D and for administrators that access the administration server 204 via computing devices 240A and 240B. When a mobile messenger establishes a wireless network connection, it sends authentication data to control system 200. The authentication data may include a username and password to establish the identity of the user operating the mobile messenger. The authentication information may additionally include information useful for determining the location of the mobile messenger. Such information may include a hardware address associated with a wireless access point such as access point 226 or WWAN tower 228. The information may further include geographic coordinates such as latitude and longitude coordinates obtained from a Global Positioning System (GPS) device included with the mobile messenger. Additionally, the network address, such as an Internet Protocol (IP) address, assigned to a connected mobile messenger may indicate the approximate location of the mobile messenger. Upon receipt of authentication information, authentication authority 206 compares the provided authentication information with information stored in user database 212. If the authentication information is valid, such as a username and password matching a username and password stored in the user directory, then the authentication authority updates status information held in the user directory to indicate that the user is connected, and the network address to which communications and command messages should be sent. Authentication authority 206 may update user database 212 with additional information sent from the authenticated mobile messenger including the time of when the device was authenticated, the IP or other network address currently assigned to the mobile messenger, and any location information as discussed above. The authentication process may be repeated when the mobile messenger establishes a connection with a different wireless network.

Administration server 204 provides an administrative interface, or portal, allowing one or more administrator users to view or modify data held in user database 212 and message database 216. One embodiment of a portal is a web server that enables administrators to access the administrative interface using compatible client software on remote computing devices. As used herein, any administrative action or command refers a human administrator submitting a request to the administration server 204 via the administrative interface using a computing device such as devices 240A and 240B, or any of mobile messengers 232A-232D. The control system 200 receives the request in the form of one or more data messages via WAN 220 or LAN 222, and one more software programs in the administration server 204 execute actions in response to the request. As described below, one or more software programs in the authentication authority 206 may prevent administration server 204 from executing a request if the administrator who submitted the request lacks authority to make the request. In the example of FIG. 2, administration server 204 implements a web server that provides a portal administrative interface for administrators to access remotely via WAN 220 or LAN 222 using a standard web-browser from a remote administration host such as computing systems 240A and 240B. In embodiments of mobile messengers that include a web browser or other remote access software, one or more of the mobile messengers 232A-232D may also access administration server 204. In alternative embodiments the gateway may include alternative gateway and portal services including SMS portals, email portals, and any other gateway service that is adapted for use with client computing devices including the mobile messenger devices. The portal enables administrator users to view, add, revise, or remove user information from user database 212. This ability includes displaying the status of all known users to determine if each user has a mobile messenger that is maintaining an active wireless network connection with control system 200. The portal also enables administrators to view communications messages held in the message database 216, including status information as to whether a message has been received or read by one or more recipients. Administration server 204 also permits an administrator to send communications to a group of multiple mobile messengers. For example, an administrator may send a broadcast message to all mobile messengers. Administration server 204 passes the broadcast communications message to messaging server 208 which then sends the communications message to each of mobile messengers 232A-232D.

Administration server 204 is additionally configured to receive requests from an administrator to send command messages to one or more of the mobile messengers 232A-232D. A command message is a data message that instructs a mobile messenger to take an action in response to the command. As described in more detail below, various command messages may inform a mobile messenger to take actions including emitting an alarm sound or deleting stored message data. In response to an administrator requesting an action for the device of a particular user, administration server 204 determines the network address of a device belonging to the user from the user database 212 and sends the appropriate command message. Administration server 204 may also send commands messages automatically in response to predefined events occurring. An example of such a predefined event is sending a command to set the volume level of audio output of a mobile messenger to mute in response to the mobile messenger sending location information indicating it is in a predetermined location.

The authentication authority 206 may limit access to the command system 200 for different administrator accounts.

For example, a subset of administrator accounts may have full access to all functions of the control system 200, including the ability to establish accounts and change permissions for other administrator accounts. The remaining administrator accounts have selective permission to manage various functions including the control of mobile messenger devices, permission to send high-priority pages to groups of mobile messenger devices, and permissions to review reporting information stored in the control system for one or more mobile messenger devices. The administrator accounts with limited access may also be restricted to administration of a subset of the mobile messengers. For example, a medical administrator may have permission to send group pages to all medical staff in a single department of a hospital, but not to other departments. Another administrator may have permission to update a published address book list for medical staff in the emergency room, but not for other address book lists.

Authentication authority 206 permits or denies administrator commands using a role based access control (RBAC) system. The RBAC system associates each administrator account with one or more roles. Each role defines a set of permitted operations that an administrator with the role may make, and a set of objects upon which the permitted operation may act. For example, the aforementioned medical administrator has a role that enables the operation of sending group pages, and the role further limits paging operation to the paging group of staff associated with the administrator. This role permits the group page operation, and limits the operation to a predetermined set of objects, where the relevant objects are the paging groups. A single administrator may have one or more roles that grant various permissions to access functions in the administration server 204.

In control system 200, administrators with a senior administrator role may have permission to establish and revise roles, establish new administrator accounts, and to associate each administrator account with one or more roles. Each role may be stored as a record in the user database 212 for use by the authentication authority 212 in authorizing one or more operations that authentication server 204 executes in response to commands received from administrators. When control system 200 receives a new request submitted by an administrator, the authentication authority 206 identifies the roles corresponding to the administrator and then identifies whether the roles permit the operations and objects specified in the request. If the request is permitted, administration server 204 executes the request. If the request is not permitted, the administration server 204 does not execute the request and the authentication authority 206 may generate a record of the request and store the record in the user database 212 for auditing purposes. While control system 200 is shown implementing an RBAC system, various other access control techniques including mandatory access controls, discretionary access controls, and lattice-based access controls may be employed to define permissions for each administrator.

Messaging server 208 sends and receives communications messages sent to or from one or more mobile messengers 232A-232D. All communications messages sent by a mobile messenger or intended for a mobile messenger are directed to messaging server 208 prior to final delivery to the intended recipient. When a new communications message is received, mobile server 208 stores the message and associated metadata in message database 216. Messaging server 208 is configured to determine the intended recipient of the communications message, and if the recipient is another mobile messenger, the communications message is sent to the recipient device if that device is available to receive communications messages in user database 212. Messaging server 208 may queue unsent messages until such time as the intended recipient mobile messengers becomes available to receive messages. Messaging server 208 is also configured to transmit archived communications message data and other user data to a mobile messenger, even when the transmitted messages may have been previously delivered. These transmissions may occur when an existing user registers a new mobile messenger by providing authentication information to authentication authority 206. Messaging server 208 sends the archived message content to the newly registered mobile messenger so no communications messages are lost when a user registers a new device.

Messaging server 208 is further configured to transmit communications messages between mobile messengers 232A-232D and various third-party networked devices such as smartphone 236. Such functionality is known as interworking or internetworking. Messaging server 208 may convert between different communications protocols to facilitate message delivery. For example, if smartphone 236 sends an SMS text message to mobile messenger 232A, messaging server 208 may extract the contents of the text message, and re-encode the message using an alternative protocol such as the Extensible Messaging and Presence Protocol (XMPP) instant messaging protocol. Similarly, a reply message send from mobile messenger 232A to smartphone 236 may be sent using XMPP, and messaging server 208 may be configured to re-encode the message in SMS or in a third message protocol such as an email. To facilitate this interoperability, user database 212 may include alternative aliases identifying each user including one or more email addresses, phone numbers, or instant messenger screen names.

In operation, the mobile messengers 232A-232D and control system 200 may send and receive command messages, communications messages, and various data including address book and configuration data using a publisher-subscriber, or "pubsub" communications model. An example of an existing pubsub protocol is the XEP-0060 Publish-Subscribe extension to the XMPP protocol. Using the XMPP protocol or any other pubsub scheme, an efficient transmission of communication of data, including authentication, communication, and command messages, reduces operating costs and improves network performance. In some pubsub models, published information may be distributed in a multicast manner such that published information may be sent to multiple subscribers without the need to retransmit published information for each of the subscribers. Existing pubsub models operate on a "best effort" basis that attempts to deliver published data, but provides no guarantee that subscribers receive the data and generate no record indicating whether a particular subscriber received published data. To improve reliability over existing pubsub systems, the embodiments disclosed herein are implemented to ensure that published data is quickly and reliably transmitted to the subscribers automatically.

In the embodiment of FIG. 2, a publisher node, or publisher, makes available or "publishes" data that one or more subscriber nodes may selectively receive via a subscription. The subscriber node, or subscriber, establishes a "subscription" with the publisher node to subscribe to some or all of data that the publisher node publishes. As used herein, configuring a subscription refers to a configuration where a subscriber node is registered with the publisher node to receive published data. The subscriber device may send a message to the publisher node to configure the subscription, or a third party such as an administrator may preconfigure the subscription in both the publisher node and subscriber node. Once a subscription is established, published data may be sent to the subscriber nodes using either or both of a "pull" model where the subscriber may request published content and a "push" model where the publisher initiates transmission of updates to published data to subscribers. In the embodiment disclosed herein, the publisher node maintains a record that identifies the computing device associated with each subscriber node and the publishing nodes with which the subscriber node has established a subscription. Additionally, each published node contains a version number which is incremented each time new data is published. A version number is an integer or any identifier that may be incremented and compared to other version numbers to identify the order in which data messages are generated. Each subscriber maintains the version number for the last received update for each subscribed node. Using the version number, the subscriber can filter stale or out of order receipts of update messages by comparing the version in the received message to the highest version number yet received. If the version number is less than or equal to the highest version number seen, then the message is stale and may be ignored by the subscriber.

In operation, control system 200 establishes one or more default subscriptions for each of the mobile messengers 232A-232D to enable the mobile messengers to receive communications and command messages. The mobile messengers 232A-232D may subscribe to published information provided by control system 200 to access resources including address books or paging groups. Authentication authority 206 may control access to limit the publication nodes that each mobile messenger may subscribe to in accordance with access control rules stored in the user database 212. Each mobile messenger 232A-232D may also establish one or more publisher nodes, with the control system 200 acting as a subscriber to receive published information including monitor and report data generated by each mobile device.

Figure 16:
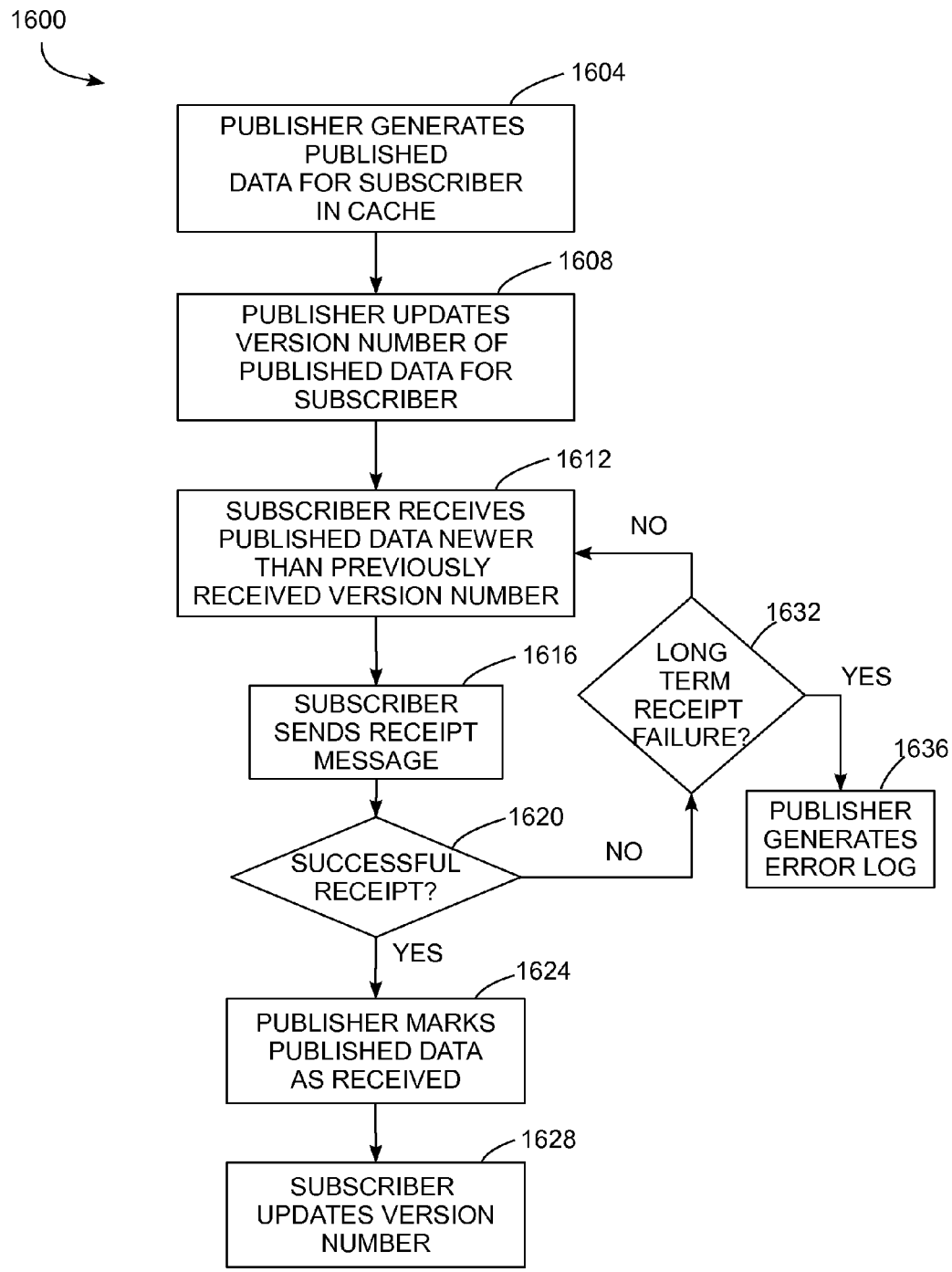
FIG. 16 is a flow diagram of a method for delivering published content to a subscriber using a publisher-subscriber network model.

Control system 200 and mobile messengers 232A-232D are configured to guarantee either that subscriber nodes receive published data, or that a record is generated to indicate that a subscriber cannot receive the message. FIG. 16 depicts a process 1600 for guaranteed message delivery in a pubsub system. A publisher node generates data to be published and stores the data in a cache (block 1604). Examples of published data include communications messages and command messages that the control system publishes for one or more mobile messenger subscribers. The cache may be an internal memory, such as the data storage 140 in a mobile messenger, a database, such as user database 212, and message database 216 in the control system 200, or any data storage device that is configured to hold the published message data. The cache may also include the version number associated with each message for each of the subscribers.

When publishing data, a publisher node makes the data available to all subscribers and updates a version number associated with each subscriber that has a subscription for the published data. (block 1608). The version number is associated with published data and one subscriber to the published data. The publisher node has a record of the newest version number associated with each subscriber, and the publisher increments the version number each time new data are published. In the system of FIG. 2, the control system 200 may store the newest version numbers for each mobile messenger device in user database 212. The subscriber stores a version number corresponding to the most recent data that the subscriber received from the publisher, and the subscriber may receive new data having more recent version numbers than the stored version number. Since multiple subscribers may subscribe to a single publisher node, the publisher node may generate version numbers corresponding to each subscriber. Since each subscriber may subscribe to multiple publishers, each subscriber may store a version number corresponding to each publisher.

In process 1600, the subscriber receives published data having version numbers newer than the version number corresponding to data previously received from the publisher (block 1612). In response to receiving the published data, the subscriber node sends a receipt message (block 1616), also referred to as an acknowledgement message, to the publisher. The receipt message may include a checksum, message digest, or other message verification data to confirm that the subscriber received the published data without any corruption or data errors. If the receipt message indicates the subscriber received the data successfully (block 1620), then the publisher marks the published data as received (block 1624). Data messages marked as received by all subscribers may be removed from the cache. The subscriber updates the version number of published data that the subscriber node has received to the newest version number of the message data received from the publisher node (block 1628). In the event of failed message delivery (block 1620), the publisher node may attempt to send the published data to a subscriber one or more times (block 1612). In long-term failure modes where a subscriber is unable to receive data after predetermined period of time or predetermined number of attempts to receive the published data (block 1632), the publisher may generate a record of the error and log the error record to inform administrators which subscribers failed to receive the message (block 1636).

Certain categories of messages, including system status messages, configuration messages, and software updates may supersede earlier messages of the same type. For example, a first command message informing mobile messengers of approved wireless access point SSIDs may be superseded by an updated list of SSIDs. To minimize the number of unneeded update messages sent to subscribers in the event that a subscriber is offline when an earlier message is published, the publisher maintains a link between the cached published data and the subscriber. When the publisher generates new message data for a subscriber, the publisher checks the previously published message data to determine if the subscriber has acknowledged receipt of the previously published data. If the previously published data have not yet been received by the subscriber, then the cached previously published data are evicted before inserting the updated published data into the cache. Thus, when a subscriber is unavailable for an extended period of time, the publisher node only provides the most recent update messages for the subscriber.

Figure 3A:
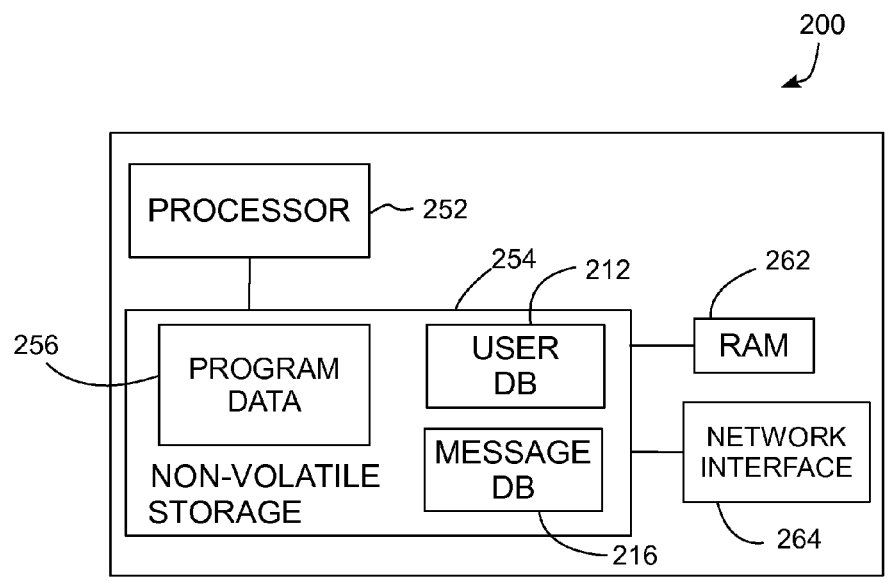
FIG. 3A is a schematic block diagram of one embodiment of a control system.

Control system 200 may include various hardware and software components that implement the administration server 204, authentication authority 206, messaging server 208, user database 212, and message database 216. FIG. 3A depicts one embodiment of the control system 200 shown as a single computing device such as a commercially available server that includes a processor 252, volatile memory such as RAM 262, non-volatile electronic data storage including magnetic drives, optical drives, and solid state devices 254, and one or more network interfaces 264. In this embodiment, the non-volatile data storage 254 stores machine readable instructions for one or more software programs in program data 256 that the processor 252 reads and executes to implement the functions of the administration server 204, authentication authority 206, messaging server 208, user database 212, and message database 216. The non-volatile data storage also stores data in the user database 212 and message database 216. The processor may read and write to these databases in accordance with the operations of the administration server 204, authentication authority 206, and messaging server 208. Network interface 264 sends and receives communications messages, command messages, and network traffic associated with administrators accessing the administration server 204. Network interface 264 may include one or more network communications devices such as wired Ethernet adapters, wireless network devices, and any networking devices that enable the control system 200 to send and receive data via WAN 220 and LAN 222. Processor 252 and network interface 264 are additionally configured to implement a compressor and decompressor to compress and decompress data sent and received via network interface 264. The compressor and decompressor may be implemented in software read from program data 256 and executed by the processor 252, or may be implemented as a hardware compressor and decompressor in the network interface 264. The compressor is configured to compress seed data read from the program data 256 prior to compressing network data, and the decompressor may optionally decompress the compressed seed data prior to receiving compressed network data. The compressor compresses data that is transmitted using the network interface 264, and the decompressor decompresses previously compressed data received from mobile messengers and other computing devices via the network interface 264. Two examples of compression techniques suitable for the compressor and decompressor are the DEFLATE and LZW techniques, although other compression and decompression techniques may be used.

Figure 3B:
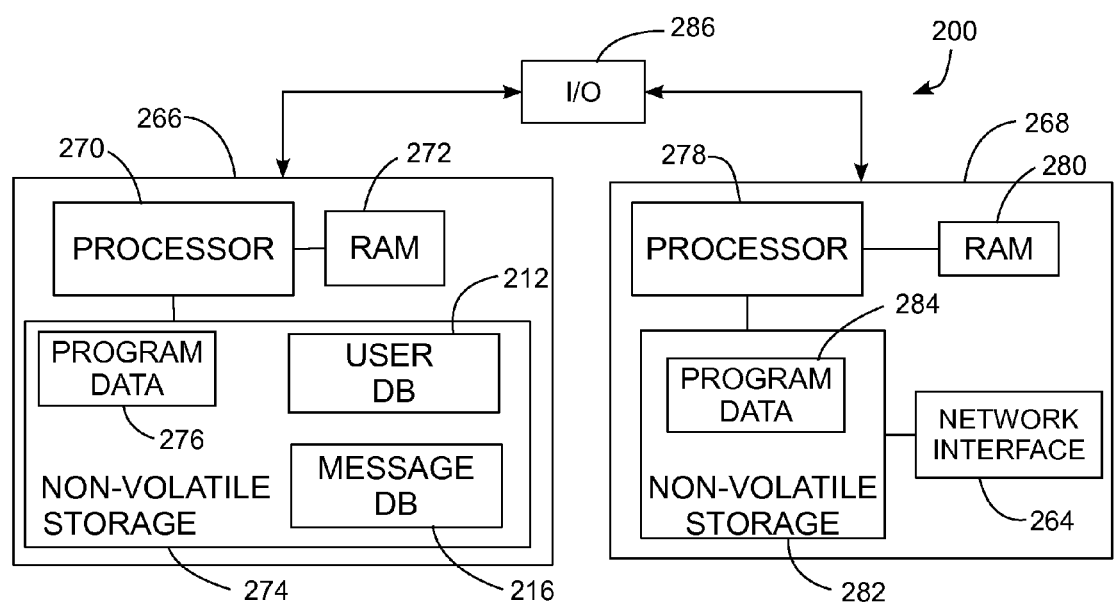
FIG. 3B is a schematic block diagram of another embodiment of a control system.

FIG. 3B depicts an alternative embodiment in which control system 200 includes multiple computing devices that are configured to operate together to perform the functions of the control system 200. A first computing device 266 is configured to store the user database 212 and message database 216, while a second computing device 268 stores program data to implement the administration server 204, authentication authority 206, and messaging server 208. The first computing device 266 includes a process 270, RAM 272, and non-volatile data storage 274. The non-volatile data storage 274 holds program data volume 276, the user database 212, and message database 216. Processor 270 reads and executes machine readable instructions stored in the program data 276 to implement the functions of user database 212 and message database 216. The second computing device 268 includes a processor 278, RAM 280, non-volatile storage 282, and network interface 264. Non-volatile storage 282 stores program data 284 that includes machine readable instructions for one or more software programs that the process 278 reads and executes to implement the functions of the administration server 204, authentication authority 206, and messaging server 208. The processor 270 and network interface 264 may implement a compressor and decompressor as described above with reference to FIG. 3A. The first computing device 266 and second computing device 268 are operatively connected through an input/output (I/O) channel 286. The I/O channel 286 enables the administration server 205, authentication authority 206, and messaging server 208 implemented on the first computing device 268 to access the user database 212 and message database 216. The I/O channel 286 may be any communications channel suitable for operating the control system. Typical I/O channels include network connections established through local or wide area networks, as well as serial, switched, and parallel data communications channels.

The mobile messenger 100 of FIG. 1 is another example of a device that may serve as control system 200. Controller 104 reads and executes machine readable instructions held in system storage 136 that implement one or more software programs for the administration server 204, authentication authority 206, messaging server 208, user database 212, and message database 216. The user database 212 and message database 216 may be held in data storage device 140 to enable controller 104 to read and write to both databases. An administrator may access the administration server directly via command software through a standard web browser on a computer or through an application programming interface into another console application running on a computer or a mobile device. This alternative embodiment may be particularly useful when a temporary network of mobile messengers is established in a remote location such as a field hospital or emergency command post.

The foregoing embodiments of control system 200 are merely examples of suitable control system configurations. Alternative embodiments of control system 200 may employ various software and hardware configurations known to the art including virtualization and clustering to implement the functions described herein.

Figure 4:
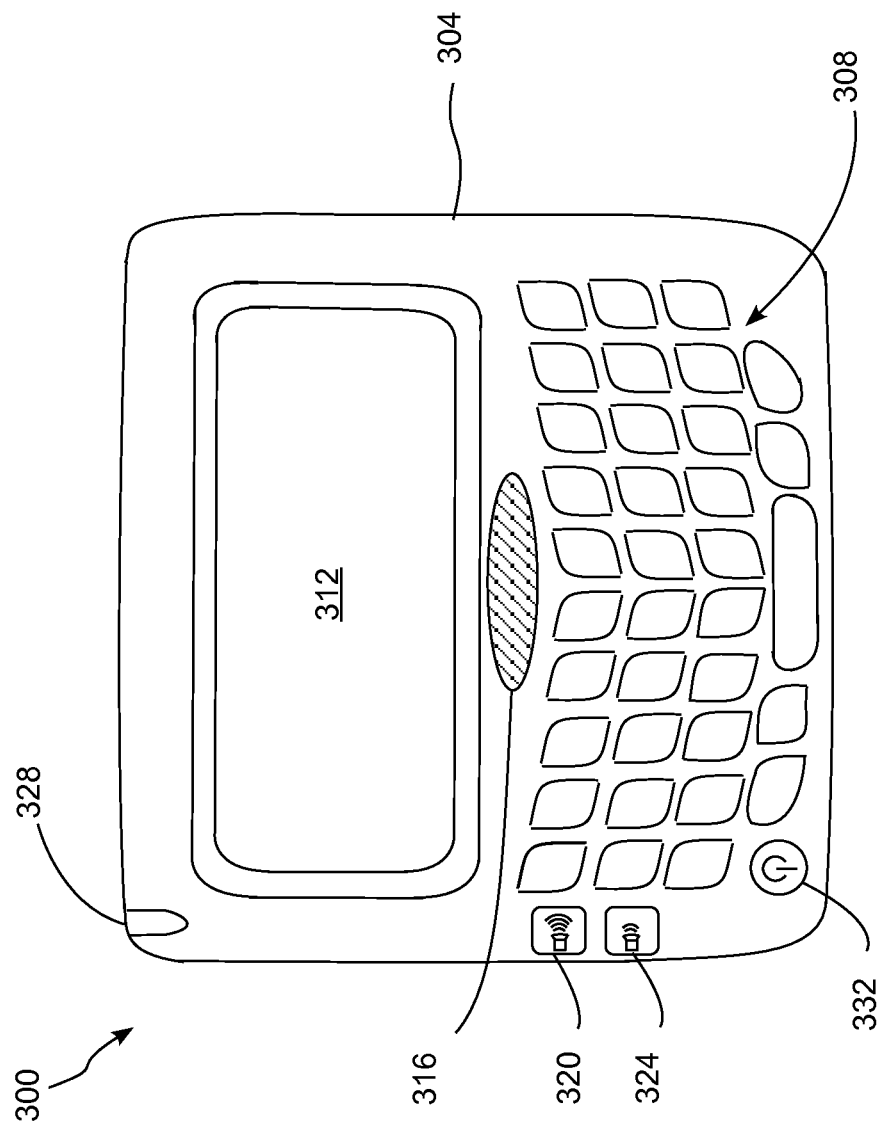
FIG. 4 is a front view of the exterior of an example mobile electronic communications device.

A front view of the exterior of an example mobile messenger 300 is depicted in FIG. 4. Housing 304 encloses the internal components discussed in FIG. 1, including a controller, wireless transceivers, and data storage devices. Housing 304 in example device 300 of FIG. 4 also encloses an antenna, but alternative embodiments may place a portion or the entire antenna externally of the housing. A keyboard 308 is disposed in the front of housing 304. The example keyboard 308 uses a QWERTY key arrangement. Alternative input devices including simplified key pads, touch pads, directional keys, and the like may also be employed in alternative embodiments. A display 312 is placed above keyboard 308. Display 312 is configured to show text and graphics received in communications messages, and is capable of displaying multiple colors. As shown in FIG. 4, display 312 uses a Liquid Crystal Display (LCD) panel including arrays of red, green, and blue (RGB) pixels that may be selectively activated to display multi-colored content. Alternative colors may be employed to distinguish various communications messages shown on display 312. For example, display 312 may be configured to display messages that are classified as being high-priority using a red color. Alternative display technologies adapted for mobile electronic devices such as Organic LED (OLED) displays may also be used for display 312. While display 312 in FIG. 4 displays message data, alternative embodiments may employ touch-screen displays that both display message data and accept user input. A speaker 316 is configured to emit audible alerts and to play audio content for communications messages that include audio content. Speaker 316 may have its volume level adjusted higher or lower by buttons 320 and 324, respectively. Speaker 316 may additionally have its volume level adjusted by the controller in response to command messages or detection of predetermined conditions without using manual actuators, such as buttons 320 or 324. An indicator light 328 may provide visual feedback indicating that mobile messenger 300 has received a new communications message, or to indicate an operating state such as a light indicating that a network connection with a wireless network is established. Indicator light 300 may include a plurality of light elements such as a plurality of light emitting diodes (LEDs) that emit various colors to provide various notifications. A power button 332 is disposed on housing 304 to enable the end user to activate and deactivate the mobile messenger 300.

The mobile messenger 300 of FIG. 4 is merely one example of a mobile electronic communications device that is suitable for use with the system of FIG. 2. Numerous alternative embodiments are envisioned using modified hardware components. Additionally, certain smartphone devices may be reconfigured as mobile messengers like mobile messenger 300 using software stored in a portion of the smartphone's memory. This software may replace the original functionality of the smartphone with the functionality described herein, or the software may augment the normal operations of the smartphone. This reconfiguration enables owners of existing mobile electronic communications devices to interoperate with the system of FIG. 2 without the need to replace the existing devices.

Figure 5:
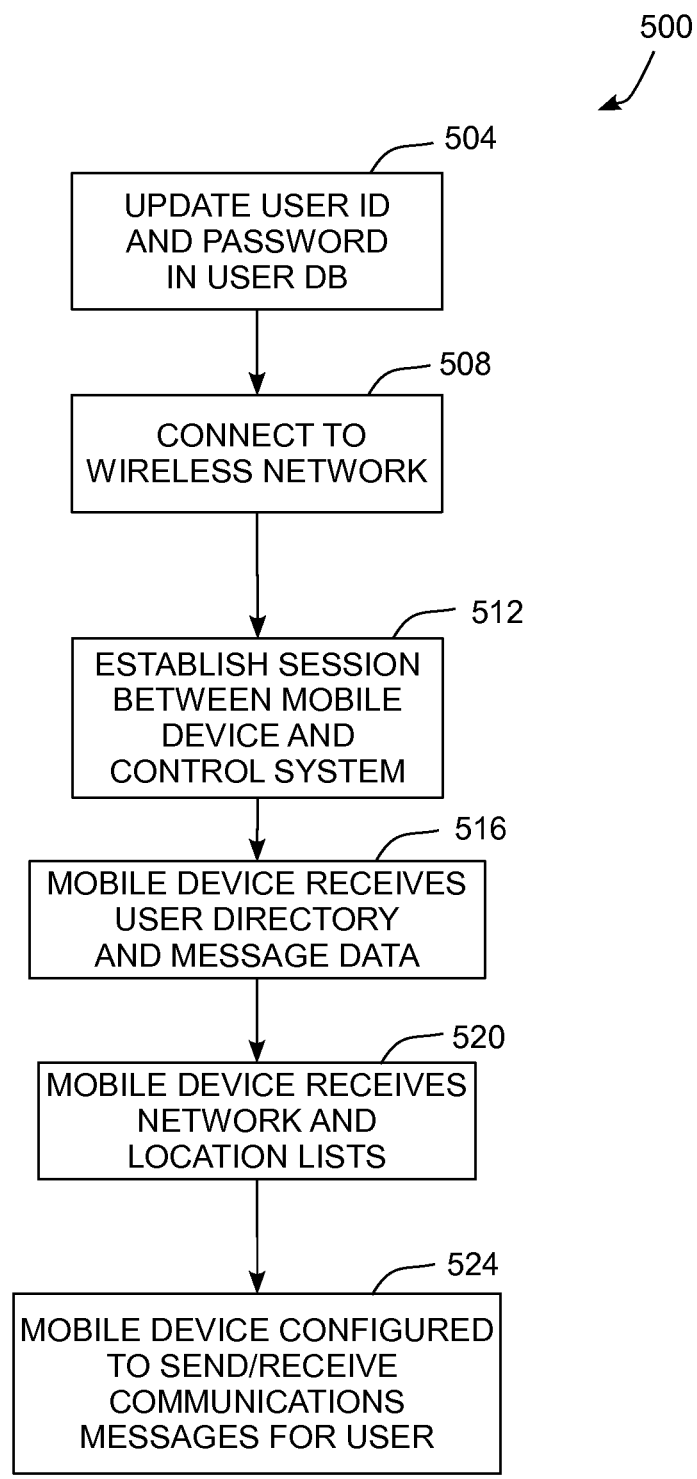
FIG. 5 is a flow diagram of a method for initializing a mobile electronic communications device for use with a control system.

A process 500 suitable for configuring the mobile messenger of FIG. 1 to operate with the control system of FIG. 2 is depicted in FIG. 5. First, if a new user is being added to the user database in the control system, an administrator updates the user database with the user's name and password (block 504). The mobile messenger then establishes a network connection to a wireless network (block 508). This connection is established automatically, and the mobile messenger may select a single network to join from a plurality of networks as discussed in more detail below. Once connected to the wireless network, the mobile messenger establishes a session with the control system (block 512). The mobile messenger and control system may be configured to use an authentication protocol, such as the Simple Authentication and Security Layer (SASL) protocol, that enables the mobile messenger to verify the authenticity of the control system that receives the authentication data, and the control system is able to verify the authenticity of the mobile messenger. The mobile messenger may require authentication information such as a username and password to establish the session. In some embodiments, an administrator enters the authentication information once when initializing the device and this information is not accessible to the user of the mobile messenger. When the mobile messenger establishes a session for the first time, the control system stores an identifier provided by each mobile messenger device in association with the user account that established the session. In the example of FIG. 2, the authentication authority 206 stores an identifier corresponding to each device, such as a hardware Media Access Control (MAC) address, in association with the user in user database 212.

In existing messaging systems including the XMPP messaging system, the client and server exchange various information to establish a session. The server may inform the client of various features that the server supports, and the client may send presence information to the server to inform other clients that a new client has established a session with the server. In the embodiment of FIG. 5, the control system establishes a session with the mobile messenger (block 512) without sending a list of supported features to the mobile messenger. The control system and mobile messenger are both configured with a predetermined set of features, and omitting the redundant information reduces the amount of network traffic generated each time a session is established. The control system also suppresses the broadcast of presence information corresponding to a mobile messenger device when the mobile messenger device establishes a session with the server. This data suppression also reduces the amount of network traffic generated in response to establishing a new session.

Process 500 uses the pubsub communications model described above to establish default subscriptions and distribute directory information and archive messages to a mobile messenger once the mobile messenger has established a session (block 516). The archived message information is stored in the control system and is published for the mobile messenger to enable the mobile messenger to display communications messages sent prior to activating the mobile messenger. The directory information may include address book entries for other users in the user database. User directory information may also include paging groups that include predefined groups of contacts. A paging group record identifies each member of the paging group and is stored in the directory information. Receipt of a paging group identifier enables the control system to retrieve the paging group record and determine each member in the group. Each paging group may include multiple recipients who receive pages or other messages from an administrator or user. For example, in a medical setting, all doctors in a single department of a hospital may belong to a paging group for sending and receiving messages to the group. For existing users, customization settings stored in the user database directory may be downloaded to restore custom user interface settings used in a different mobile messenger to the newly configured mobile messenger. For a new user, any communications messages received prior to authenticating the mobile messenger are received as well. For first-time authentication of a new mobile messenger, a hardware address unique to the particular mobile messenger is stored in control system. The mobile messenger is manufactured with a network address or a unique serial number that the control system associates with the account of the new user. The mobile messenger also subscribes to published lists of authorized wireless networks, as well as lists of locations specifying special operations modes (block 520). The authorized network lists specify priorities that identify an order in which the wireless networks are to be used when more than one wireless network is available. The location lists may also include lists of locations where the mobile messenger should automatically adjust its volume level, and locations known as exclusion zones where the mobile messenger should deactivate one or more of its wireless transceivers. Updated versions of the network and locations lists may be sent to the mobile messenger after configuration process 500 is completed. The first time that the mobile messenger establishes a session with the control system, the mobile messenger receives a complete update of all the data and configuration parameters recited above. A mobile messenger that has been configured previously may establish a new session when activated from a powered down state or when the mobile messenger loses contact with a wireless network and then reconnects. A previously configured mobile messenger only receives updated message data, directory data, and configuration data that the mobile messenger has not received during a previous session. Upon completion of process 500, the mobile messenger is configured to send and receive new communications messages (524).

Figure 6:
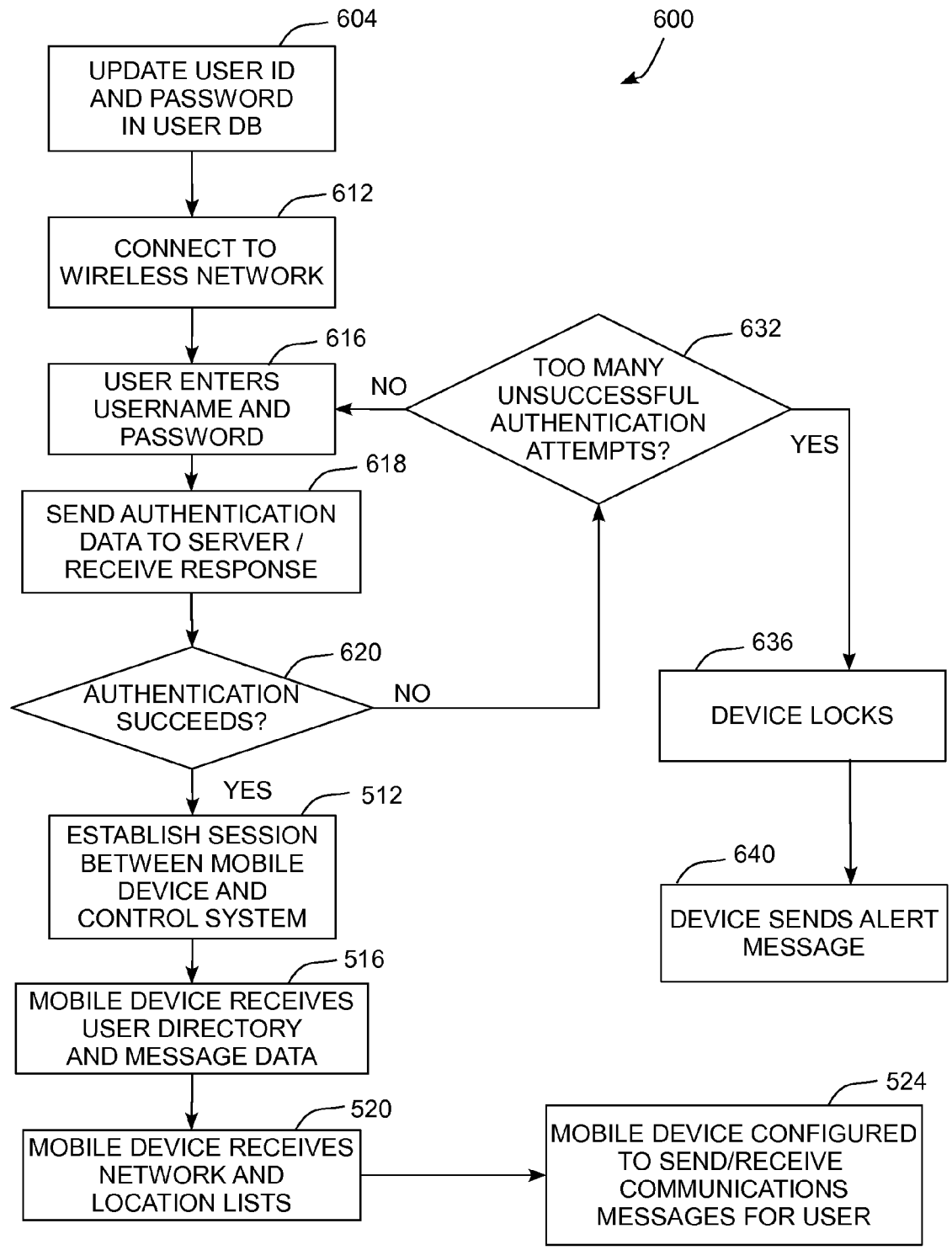
FIG. 6 is a flow diagram of an alternative method for initializing a mobile electronic communications device.

FIG. 6 depicts an alternative process 600 suitable for configuring the mobile messenger of FIG. 1 to operate with the control system of FIG. 2. In process 600, an administrator updates the user database with the user's name and password (block 604). The mobile messenger then establishes a network connection to a wireless network (block 612). This connection is established automatically, and the mobile messenger may select a single network to join from a plurality of networks as discussed in more detail below. In order to send and receive communications messages, the user must provide authentication information, which may include a username and password (block 616). In process 600, the end user of the mobile device enters the username and password in order to authenticate with the control system instead of or in addition to authenticating with the mobile messenger device. After entering the username and password, the authentication information is sent to a server, such as the authentication authority in the control system, and the control system executes an authentication process using the data (block 618).

In the event that authentication of the mobile messenger fails (block 620), the user may be prompted to re-enter the username and password (block 616). The mobile messenger may be configured to limit the number of unsuccessful authentication attempts that are permitted before authentication succeeds. The example process 600 allows the user four attempts to enter a valid username and password. Upon a fourth incorrect username and password entry, too many unsuccessful authentication attempts have been made (block 632). The mobile messenger is then locked (block 636) and may only be utilized after the messenger is unlocked by the administrator. The locked mobile messenger may optionally send an alert message to the control system, informing the administrator that the device is locked (block 640). The alert message may further include location information to aid in recovering potentially stolen devices.

In the event that the response message from the control system indicates that authentication succeeded (block 620), the mobile messenger may be configured to retain the authorization information so that the user will not be required to re-enter the authorization each time the mobile messenger establishes a connection with the control system. The mobile messenger and control system establish a session (block 512) in the same manner as described above in FIG. 5. The mobile messenger may then receive user directory and message data (block 516), configuration data including network and location lists (block 520), and is configured to send and receive communications messages (block 524) in the same manner as described in FIG. 5.

Upon completion of either process 500 or 600, the mobile messenger is configured to send and receive communications messages. The mobile messenger may be configured to subscribe to various publisher nodes, including the control system 200, to receive messages directed to the mobile messenger individually, and to paging groups that include multiple mobile messenger devices. The mobile messenger may receive various communications messages having metadata that identify a priority level for the received communications message. In one configuration, each communications message has one of four priority levels, denoted as P1, P2, P3, and P4. P1 messages are emergency or "mayday" messages that replace the display of any other message or user interface element on a display, such as display 108, until the user takes an action to acknowledge the message. Some embodiments may restrict the ability to generate P1 priority messages to an administrator sending messages via the control system, while other mobile messenger devices generate lower-priority messages. The mobile messenger may also generate sound and vibration to notify the user of the P1 priority message in response to receiving the P1 priority message. The mobile messenger overrides user-defined volume levels in the mobile messenger to make this notification more effective.

A P2 message has a lower priority than the P1 message. The P2 message also replaces the display of any other message or user interface element on the display 108 until the user takes an action to acknowledge the message. The mobile messenger may generate a sound or vibration in response to receiving a P2 message, but the P2 message does not override the user-defined volume settings for the mobile messenger. In mobile messenger embodiments that include indicator lights, both P1 and P2 messages may activate one or more indicator lights, and may blink the lights in various patterns to attract the attention of the mobile messenger user. A mobile messenger user may generate and send P2 messages to authorized paging groups and individual mobile messengers. If the mobile messenger is locked when a P1 or P2 message is received, the mobile messenger activates the display and immediately prompts the user for an unlock code to display the message. Both P1 and P2 messages may be sent to a single user, or the message may be sent to a paging group selected from an address book for an administrator or user.

In order to acknowledge a P1 or P2 message, the user may enter a reply to the message using an input device such as a touch-screen or keyboard. For efficiency, the mobile messenger may display a list of predefined responses to the message, and one or more recipients may select a response to send from the list. The predefined responses may be included with the original communications message. For example, a P1 message may inform recipients of a meeting. The predefined responses could include "Attending," "Not attending," and "Arriving late" as possible responses. The display presents these choices to a user, and the user must select a response to send before using the mobile device for any other function. The mobile messenger sends the response message, and messaging server 208 receives all response messages and stores the responses in the message database 216. Administrators and the party who sent the original high-priority message may receive both the responses from individual recipients and view aggregate statistics of the total number of message recipients and the number of recipients that have acknowledged the message.

P3 messages are standard priority messages. These messages may generate a visual alert on the mobile messenger display to indicate receipt of a new message, but the message does not override the user interface, and the user does not have to acknowledge the message to continue operating the mobile messenger. The received message list in the mobile messenger stores each P3 message for later review. The mobile messenger may generate an audible sound or vibrate in accordance with user defined settings when a P3 priority message is received. A P3 priority message may optionally include a set of predefined responses, or the recipient may enter a response using input devices such as keyboard 308. If the mobile messenger receives a P3 message while locked, the messenger may generate an audible sound in accordance with user settings, but receipt of the message does not immediately cause the messenger to prompt for an unlock code to display the message.

P4 messages are the lowest priority messages, and administrators send P4 messages to one mobile messenger or to a paging group. These messages appear in the message list stored in the data storage device in each mobile messenger, but the mobile messenger does not generate a visual alert or audible sound when a P4 priority message is received. P4 priority messages are for general announcements, and a mobile messenger user does not send communications messages to respond to a P4 priority message.

The P1-P4 priority levels described above are merely exemplary of a system for handling messages with various priority levels. Alternative embodiments may include more or fewer priority levels, and the mobile messenger may be configured to take various actions in response to receiving messages of each priority level.

Figure 7:
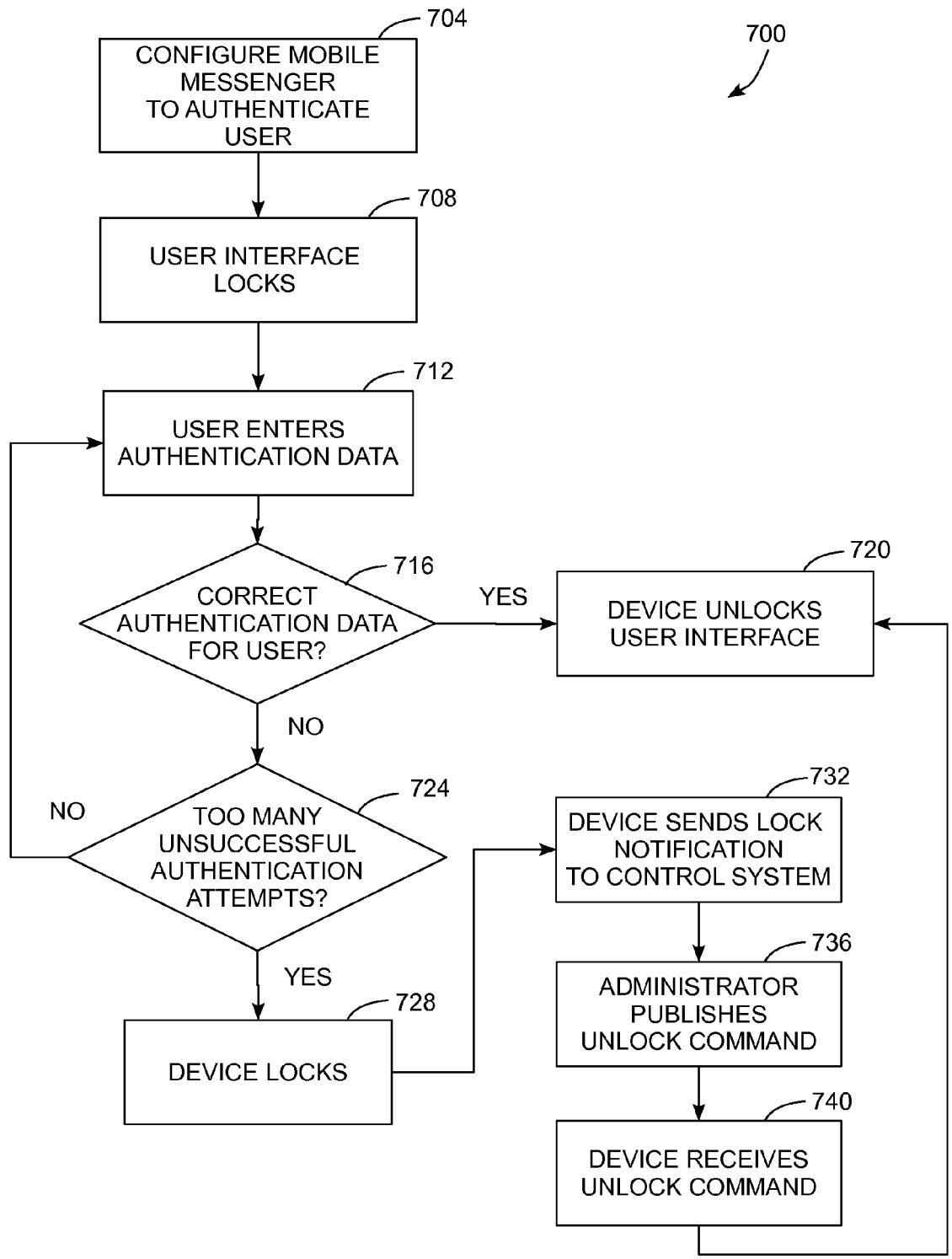
FIG. 7 is a flow diagram of a method for controlling user access to a mobile messenger device.

FIG. 7 depicts a process 700 for controlling access to the user interface of a mobile messenger. A mobile messenger device may lock access to the user interface to prevent unauthorized use of the mobile messenger. Process 700 begins by configuring the mobile messenger to authenticate the user (block 704). In one embodiment, the mobile messenger prompts the user to enter a password or other authentication information using one of the input devices. The control system may configure the mobile messenger to require that the user configure the device with a password. The mobile messenger may optionally transmit the authentication information or data corresponding to the authentication information, such as a password hash, to the control system where the authentication information is associated with the user in the user database. Passwords or "lock codes" are one example of authentication data, but various other authentication mechanisms including biometric identification, security tokens, and multifactor authentication techniques may be used as well. During operation, the mobile messenger locks the user interface (block 708). The mobile messenger may lock the user interface after a predetermined period of inactivity, or in response to a user command to lock the user interface. When the user operates an input device, the mobile messenger displays a prompt that requests authentication data, and the user enters the authentication data (block 712). In process 700, the controller in the mobile messenger device, such as controller 104, processes the authentication data and permits or denies access to the user data in response to the authentication data. This may be referred to as "local security" since the mobile messenger determines the validity of authentication data without sending or receiving data to the control system. If the user provides the correct authentication data (block 716), the mobile messenger unlocks and presents the user interface (block 720).

In the event that authentication of the mobile messenger fails (block 716), the user may be prompted to enter the authentication data again (block 724). The mobile messenger may be configured to limit the number of unsuccessful authentication attempts that are permitted before authentication succeeds. The example process 700 allows the user four attempts to enter a valid username and password, although fewer or greater numbers of attempts may be permitted. Upon a fourth incorrect username and password entry, too many unsuccessful authentication attempts have been made (block 724). The mobile messenger is then locked (block 728), and the mobile messenger sends a notification message to the control system indicating that the device has been locked (block 732). The mobile messenger ignores further attempts to enter authentication information when locked. An administrator with permission to unlock the mobile messenger may receive the lock notification and publish an unlock command message (block 736). The mobile messenger is subscribed to receive the unlock message (block 740) and unlocks after receiving the unlock command (block 720). In an alternative embodiment, the device prompts for the use to enter authentication data instead of unlocking in response to receiving the unlock command.

Figure 8:
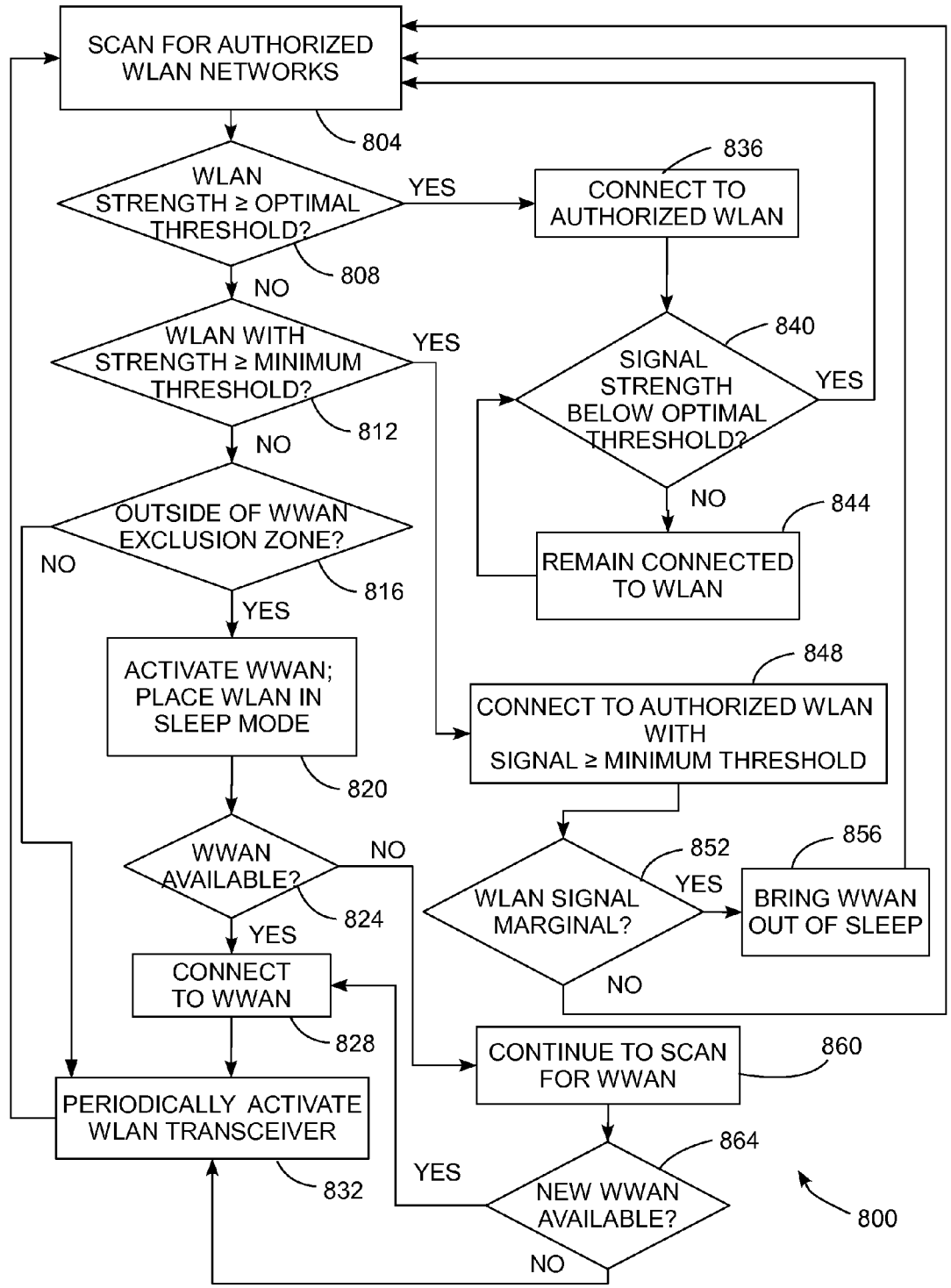

A process 800 for establishing network connections between a mobile messenger and multiple wireless networks is depicted in FIG. 8. Process 800 begins by detecting one or more available wireless local area networks (WLANs) (block 804). Multiple WLANs may be available in a single location. For example, an 802.11 transceiver may detect three different access points corresponding to networks A, B, and C. The list of available networks is compared to the internal list of networks held in the mobile messenger to determine if any of the available WLANs are authorized for use by the mobile messenger. The mobile messenger first searches for an authorized WLAN that has a measured signal strength greater than a predetermined threshold for optimal signal strength (block 808). In the context of process 800, a measured signal strength for a WLAN device may be generated from a Receive Signal Strength Indicator (RSSI) measurement produced by the WLAN transceiver. The RSSI is a numeric value that represents the relative signal strength of a signal received from a WLAN access point within a range having predetermined maximum and minimum numeric values. The measured signal strength number may be represented as a percentage of the maximum RSSI numeric value. In one embodiment, the optimal signal strength threshold is 40% of the maximum RSSI value. A WLAN with a signal strength at or above the optimal threshold enables the mobile messenger to transmit and receive communications messages more quickly, and enables the mobile messenger's WLAN transceiver to operate at lower power levels. The mobile messenger connects to the authorized WLAN having the strongest signal (block 836). Additionally, the WWAN transceiver in the mobile messenger may also be deactivated if it was previously active. The deactivated WWAN may be placed in a "sleep" mode that uses a minimal amount of electrical energy while still allowing the WWAN transceiver to be energized quickly if it is needed. Process 800 continues by periodically checking the signal strength after the WLAN connection is established (block 840). As long as the signal strength for the authorized WLAN remains at or above the optimal threshold, the wireless connection is maintained (block 844). If the signal strength drops below the optimal level, the WLAN connection may still remain active, but the mobile messenger begins scanning for authorized WLANs having stronger signals (block 804). This scanning typically occurs in situations where a mobile messenger is carried to a different section of a building after connecting to a wireless access point and the mobile messenger begins to scan for stronger authorized WLAN signals.

In the event no WLAN networks with signal strengths greater than the optimal threshold are available (block 808), the mobile messenger may still be able to connect to an authorized WLAN as long as the signal strength available is above the minimum threshold needed to send and receive communications messages reliably (block 812). If this condition is detected, the mobile messenger connects to the WLAN with the strongest available signal (block 848). In one embodiment, the minimum signal strength threshold is 1% of the maximum RSSI signal strength, or any measured signal strength level that is sufficient to send and receive data with the corresponding WLAN access point. In cases where a WLAN signal is not above the optimal threshold, but is still above the minimum threshold, a predefined intermediate signal strength threshold known as a marginal threshold may be stored in the mobile messenger. While a WLAN signal strength between the minimum threshold and marginal threshold is strong enough to maintain a connection, the WLAN signal may be lost if it does not grow stronger. In one embodiment, the marginal signal strength threshold is 20% of the maximum RSSI signal strength. If the WLAN signal is deemed to be beneath the marginal signal strength level (block 852), the WWAN transceiver is brought out of sleep mode (block 856). While the WWAN transceiver is not actively sending or receiving transmissions at this stage, the WWAN transceiver is primed to begin scanning for authorized networks more quickly should the WLAN connection be lost. The WWAN transceiver remains in sleep mode when the WLAN signal strength meets or exceeds the marginal threshold. The mobile messenger continues to scan for authorized WLANs with stronger signals regardless of whether the WWAN transceiver is brought out of sleep mode (block 804).

In the event the no authorized WLAN has a signal strength above the optimal threshold (block 808) or the minimum threshold (block 812), the mobile messenger deactivates the WLAN transceiver to conserve electrical power, and determines if the messenger is outside of any exclusion zones that prevent the use of the WWAN transceiver for communications (block 816). Examples of possible exclusion zones may include locations near electronic equipment that is sensitive to the radio-frequency emissions used by the WWAN transceiver. Common examples include certain forms of medical equipment and remote detonators used in explosive mining and demolition. The mobile messenger has a predefined list of exclusion zone locations stored in its memory, and the control system may send updated lists of exclusion zone locations to the mobile messenger to add, remove, or change locations that are part of exclusion zones. When the mobile messenger detects that it is in one of the predefined exclusion zones, it does not use the WWAN transceiver, but instead continues to scan for available WLAN signals (block 832). The mobile messenger may determine its location in a variety of ways including, but not limited to, data acquired from a global positioning system (GPS) receiver in the mobile messenger, or by estimating its position from the relative signal strengths of one or more WLAN access-points having known locations, as discussed in more detail below.

In the event that the mobile messenger is outside of any exclusion zones (block 816), the WLAN transceiver is deactivated to minimize power usage, and the WWAN transceiver is activated (block 820). The WWAN transceiver scans for one or more authorized WWANs available to transmit and receive communications messages (block 824). In the event that a WWAN is available, the mobile messenger connects to the WWAN (block 828). While connected to the WWAN, the mobile messenger periodically activates the WLAN transceiver to begin scanning for authorized WLAN networks that may become available after establishing the WWAN connection (block 832). While scanning for WLAN networks, the mobile messenger may identify available WLAN networks that are not present in the authorized WLAN network list. When a non-authorized WLAN is detected on multiple occasions and has a signal strength that exceeds the minimum signal strength threshold, the mobile messenger may disconnect from the WWAN network and prompt the user to establish a manual connection to the detected WLAN. The manual prompt includes a passphrase entry prompt if the WLAN requires a passphrase to establish a connection. The mobile messenger may use the WLAN instead of the WWAN to conserve battery life and to reduce operating costs incurred from using WWAN networks. To maintain private communications when using manually connected WLAN systems, the mobile messenger may send and receive command and communications messages encrypted using various encryption schemes including the Secure Socket Layer (SSL) and Transport Layer Security (TLS) protocols.

In certain situations, neither a WLAN nor an authorized WWAN is immediately available (block 824), in which case the mobile messenger continues to scan for an available WWAN (block 860). If an authorized WWAN becomes available (block 864) the WWAN connection is established (block 828), but otherwise the device continues its periodic scans for new WLAN signals as well (block 832).

Figure 9:
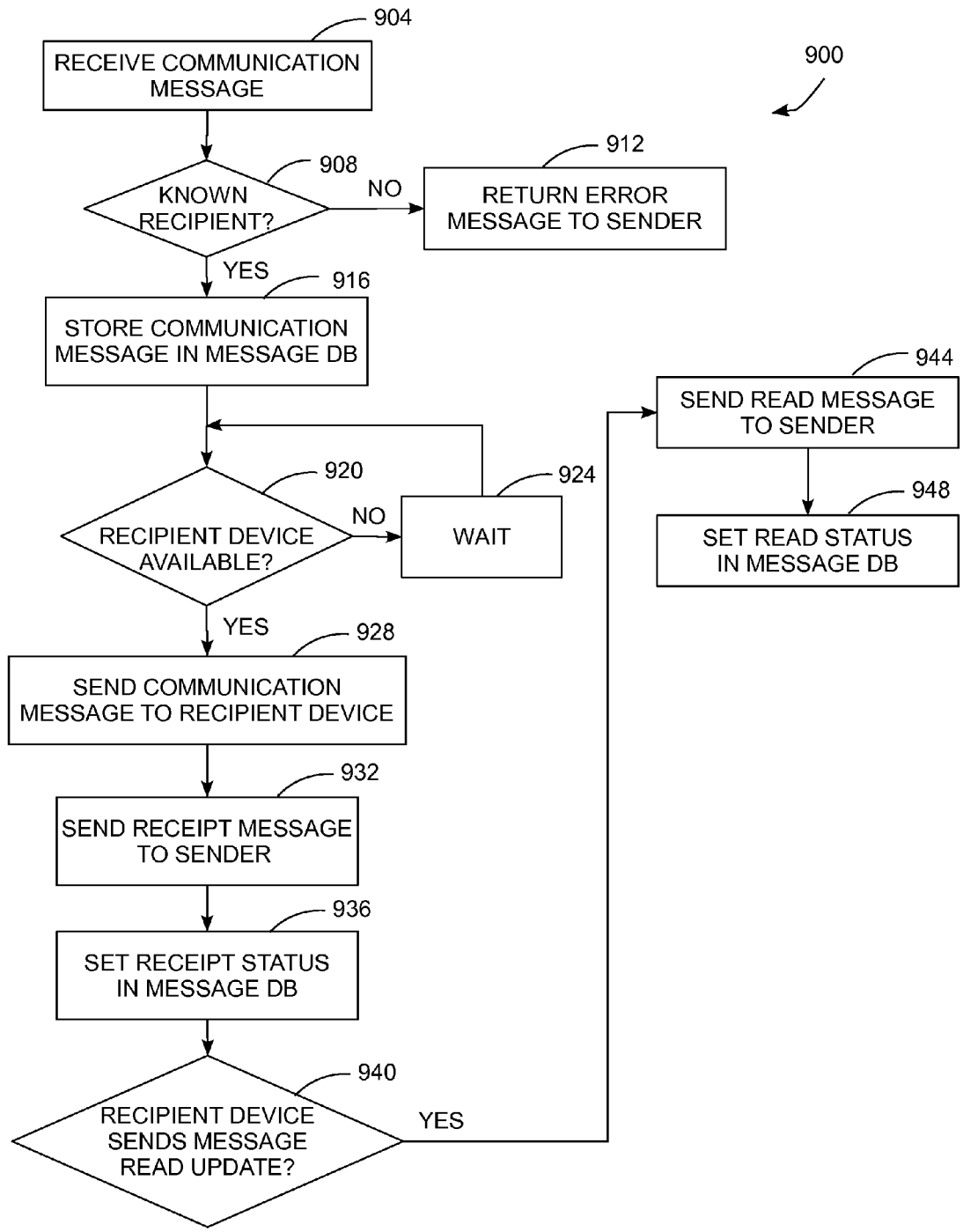
FIG. 9 is a flow diagram of a method for sending and receiving communications messages.

A process 900 for sending communications messages and tracking the status of communications messages is shown in FIG. 9. This process is suitable for use with the control system 200 of FIG. 2. The process begins when the messaging server receives a communications message (block 904). This message may be sent from a mobile messenger associated with the controller, or a third party device. If recipient data sent with the communications message identifies a known user in the user database (block 908) the communications message is stored in the message database (block 916). The messaging server also stores metadata associated with the message, such as address information of the sender and recipient, and the time of when the message was received. If an incoming message does not match a known user, however, the messaging server returns an appropriate error message to the sender (block 912). After storing a communications message, the messaging server determines whether or not the intended recipient's mobile messenger device is available to receive the message (block 920). In the event that the device is unavailable, the messaging server waits (block 924) until the device is available, possibly checking for updated status information in the user database. The message metadata may include an optional expiration time, indicating the maximum time the messaging server should wait to send the communications message. Should this time expire, the messaging server sets an expired status in the message database and removes the message from the queue of messages associated with the user. When the mobile messenger belonging to the recipient becomes available, the stored communications message is sent to the mobile messenger, which acknowledges receipt of the message with the messaging server (block 928). The messaging server sends receipt confirmation to the communications message sender, indicating the message has been delivered (block 932). The receipt information is also stored in the message database, allowing the sender or administrators to receive a confirmation message indicating that the message was received, and the time at which the message was received (block 936). After receipt of the communications message, the recipient mobile messenger device stores the sent message in its internal memory. Based on priority, the device may immediately display the message, or queue the message for user convenience. At the time the communications message is displayed, the mobile messenger sends an update message to the messaging server acknowledging that the communications message has been displayed (block 940). The messaging server subsequently sends a message informing the original sender that the communications message has been displayed (block 944) and updates the message database to indicate when the archived communications message was displayed (block 948).

Figure 10:
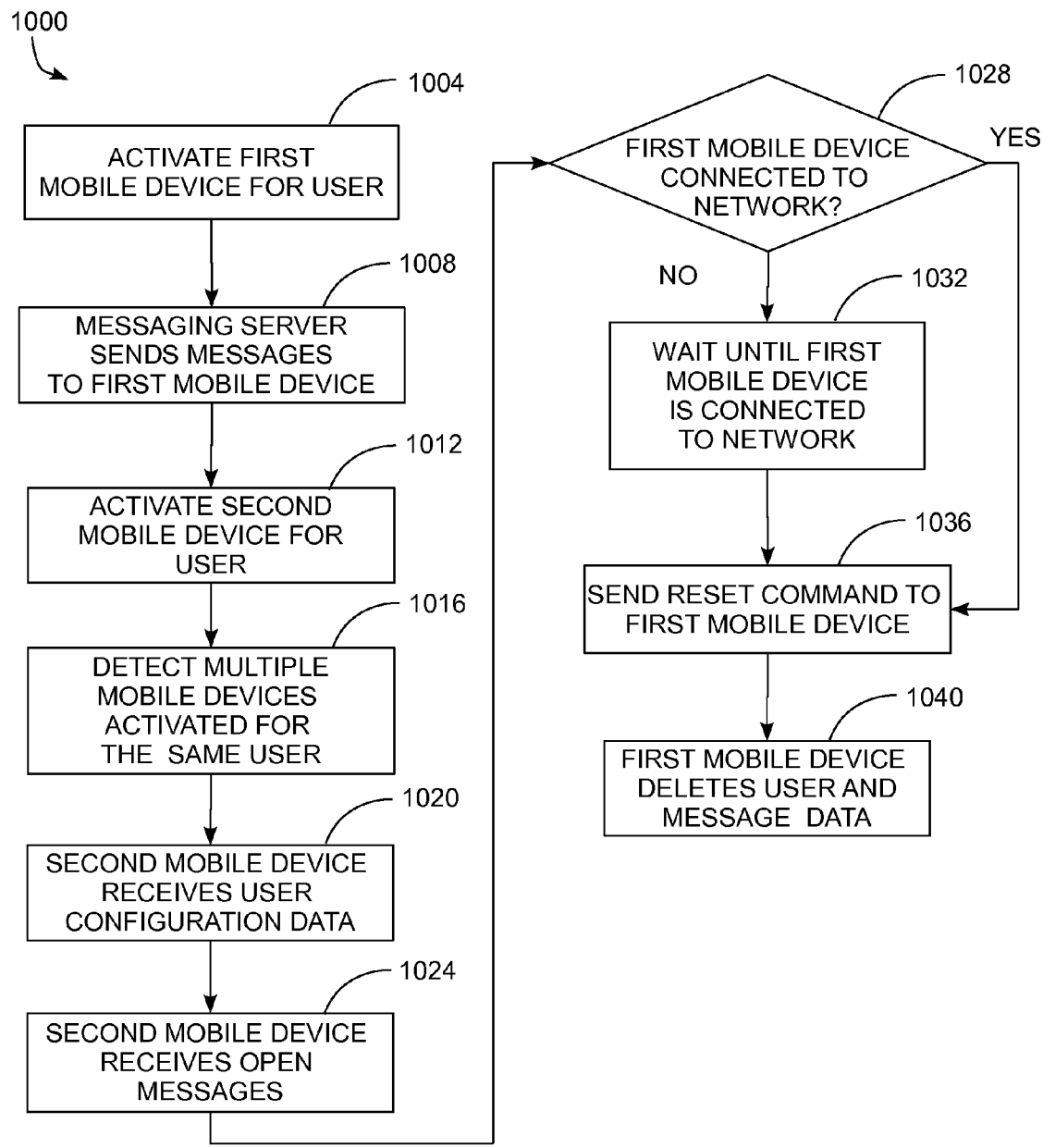
FIG. 10 is a flow diagram of a method for deleting data from a mobile electronic communications device after a second device is initialized.

A process 1000 for activating a new mobile messenger for a user having an existing mobile messenger is shown in FIG. 10. In various operational situations, a registered user who has a first mobile messenger needs to switch to a new mobile messenger. This need may occur if the first mobile messenger device is lost or stolen. Additionally, many users may only have possession of a mobile messenger for a limited duration of time, such as for the length of a work shift. At that time, the mobile messenger device is returned and issued to another user. Process 1000 enables an existing user to activate a new mobile messenger while preserving access to the stored communications messages and personal information associated with the user.

Process 1000 begins by activating a first mobile messenger and associating the device with the user to which the device has been issued (block 1004). The activation process is described in more detail in FIG. 5 and FIG. 6. The messaging server sends messages to the first mobile device in the normal course of operations (block 1008). The same user subsequently activates a second mobile messenger (block 1012). The control system determines that the second mobile messenger is different from the first mobile messenger by comparing the hardware identification code sent during the activation of the second mobile messenger with the hardware identification code of the first mobile messenger (block 1016). After the second mobile messenger is activated, it receives user information stored in the control system, including address books holding contact information used by the user (block 1020). The control system also sends any open messages, which are communications messages that have not expired and have not been acknowledged by the user (block 1024). Once the user data and open communications messages are sent to the second mobile messenger, the control system determines if the first mobile messenger is reachable via any authorized wireless network (block 1028). If the first mobile device is available, the control system sends a reset command message (block 1036) that instructs the controller in the first mobile messenger to delete all user configuration data and messages (block 1040). When the first mobile messenger is initially disconnected from any wireless network, the controller waits to send the reset command message until after the first mobile messenger becomes available (block 1032).

Figure 11:
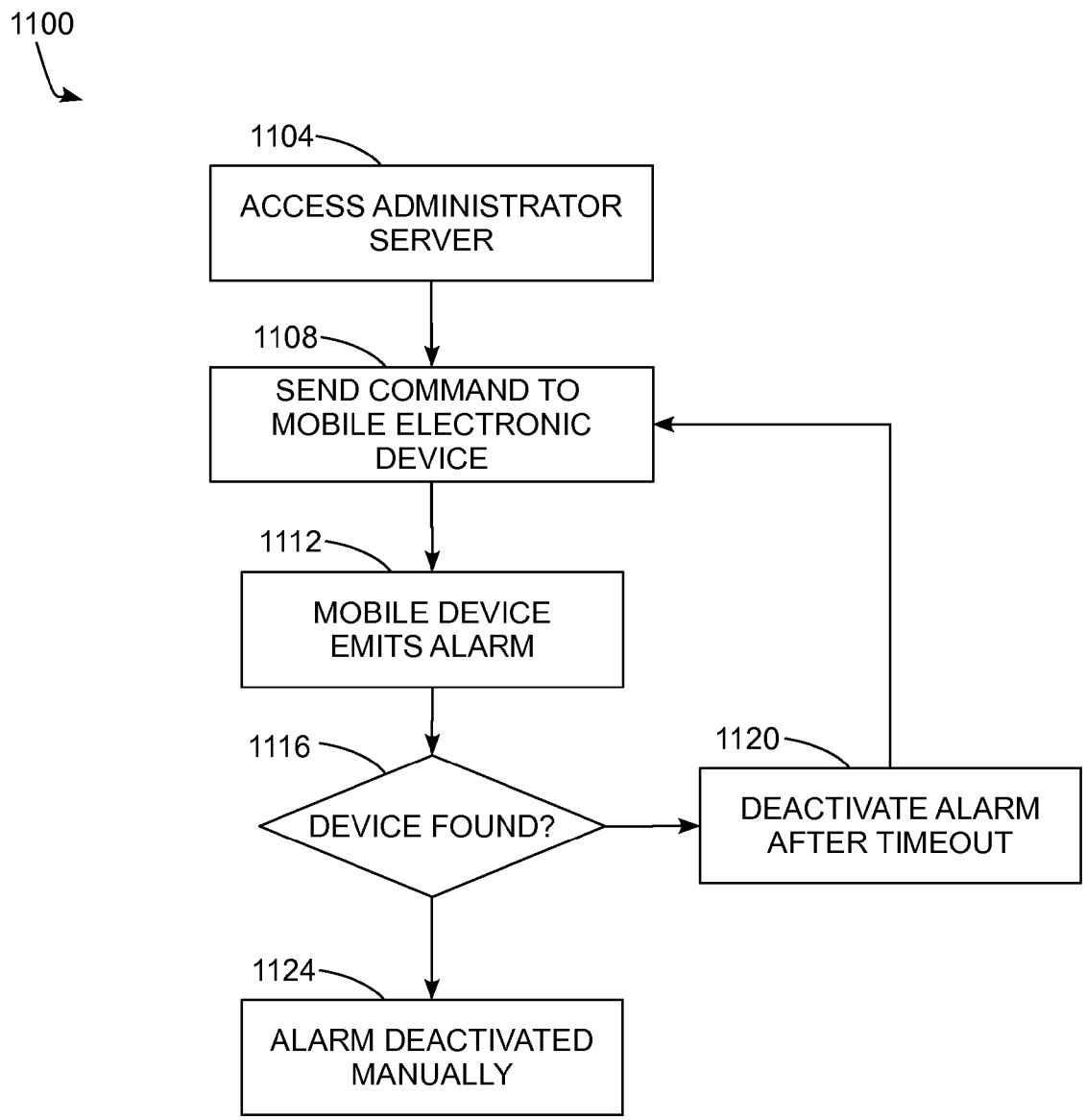
FIG. 11 is a flow diagram of a method that locates a mobile electronic device by operating the device to emit a sound.

A process 1100 for detecting a misplaced mobile messenger device is show in FIG. 11. While attempts to locate a misplaced mobile electronic communications device, such as a cellular phone, by calling the phone and listening for its ring are known, this method, however, is not always successful. For example, the success of the method may be affected by a muted phone ringer or a low volume level. Process 1100 begins with the user who lost the mobile messenger or an administrator accessing the administration server of the control system (block 1104). This access may be done via another mobile messenger or through the use of a standard computer configured to access the administration server. The administration server sends a command message in response to a request to have the mobile messenger emit an alarm (block 1108). The misplaced mobile messenger receives the alarm command message, and emits an audible alarm in response to the command message (block 1112). In emitting the alarm, the mobile messenger may be configured to adjust its volume levels higher, including adjusting to the maximum available volume. Additionally, if the mobile messenger is equipped with a vibration device or indicator lights, these devices may operate as part of the alarm. Thus, even if the mobile messenger was set to a low volume or mute state, the mobile messenger still emits an audible alarm in response to the command message. If the mobile messenger is located (block 1116), the alarm may be deactivated manually by the user sending a manual input to the mobile messenger (block 1124). After manual deactivation, the mobile messenger may restore its volume level to the level used prior to receiving the alarm command message. If the mobile messenger is not located within a predetermined amount of time, the alarm may deactivate in order to conserve energy (block 1120), and additional alarm command messages may be sent at a later time. Alternatively, instead of sending multiple alarm command messages, the mobile messenger may be configured to emit the alarm intermittently, such as sounding the alarm for five minutes with five minute periods of silence until the alarm is deactivated. This type of operation helps preserve the battery life of the mobile messenger.

Figure 12:
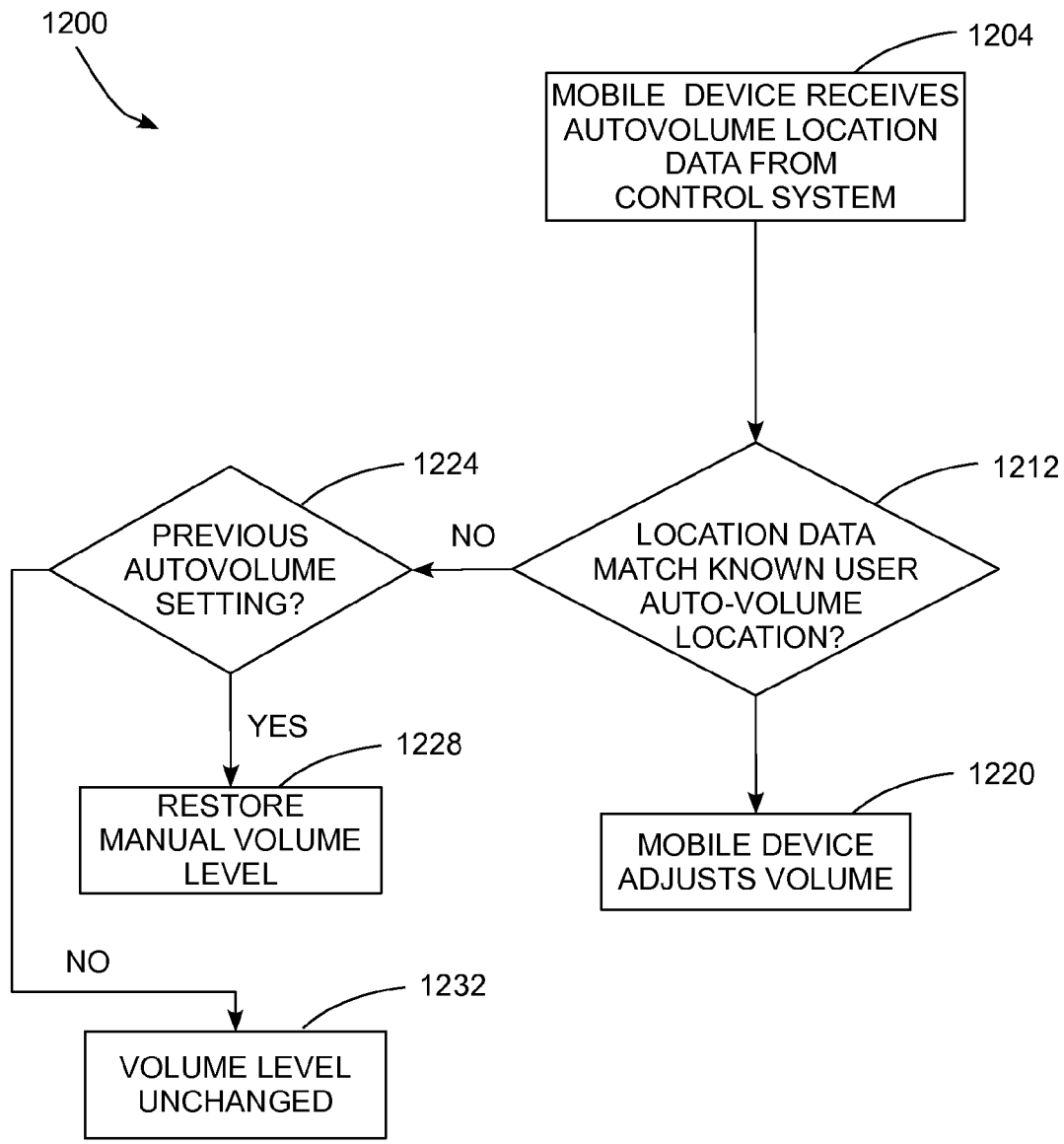
FIG. 12 is a flow diagram of a method for adjusting the volume level of a mobile electronic communications device.

A process 1200 for adjusting the volume level of a mobile messenger device is shown in FIG. 12. A mobile messenger may be disruptive if it emits sounds in certain locations. A user may neglect to adjust the volume level of the mobile messenger manually and it may emit unwanted sounds. Process 1200 begins with the control system periodically publishing control information for the subscribing mobile messenger to assign known locations to alternative volume levels or operational modes to the mobile messenger (block 1204). The location information sent may be tailored to specific users. For example, a user who is an emergency medical technician may continue to receive audible alerts from the mobile messenger when the mobile messenger is connected to a wireless network in an emergency room. However, another user who is a medical administrator may have a mobile messenger whose volume levels are muted or set to a vibrate-only mode when in the same emergency room. The location information may include data identifying the particular wireless network device to which the mobile messenger is connected, such as a unique basic service set identifier (BSSID) name for an 802.11 access point, or tower identification information for a WWAN data network cell. In embodiments of mobile messengers including a GPS device, the location data may include geographic coordinates, such as latitude and longitude. In a building with a WLAN including multiple 802.11 access points, the mobile messenger may obtain a more accurate position by evaluating the relative signal strengths individual wireless access points in the WLAN. A particular 802.11 access point may be identified by decoding a basic service set identifier (BSSID) data field transmitted by the access point. The BSSID is a unique hardware identifier for each wireless access point that is typically the same as the MAC address associated with the 802.11 access point. The BSSID uniquely identifies individual wireless access points in WLAN systems using multiple wireless access points, even if they share the same service set identifier (SSID). The mobile messenger may determine the signal strengths and BSSIDs of wireless access points by passively detecting wireless data transmissions generated by the wireless access point. This location method may include triangulation using BSSIDs sent from multiple access points to determine which floor or room of a particular building the messenger is located.

A mobile messenger subscribes to a published list of known BSSIDs associated with known locations where the mobile messenger is configured to operate in a non-standard mode, such as the WAN exclusion zones discussed above or in locations where an automatic volume level should be set. After receiving auto-volume location information from the control system, the mobile messenger determines whether its current location corresponds to one of the stored locations in which an automatically set volume level is desired for the mobile messenger (block 1212). The mobile messenger then adjusts its volume level in response to the location information stored in its memory (block 1220). The volume level stored for a given location may mute the mobile messenger, set it to a lower or higher than normal volume level, or activate an alternative message alert mode such as a vibrate-only mode. In an alternative embodiment, the mobile messenger reports detected location information to the control system. The control system then determines if the reported position corresponds to a location where the mobile messenger should operate in a non-standard mode, including modes with automatically adjusted volume levels. The control system then sends a command message instructing the mobile messenger to change operating modes, including commanding the mobile messenger to adjust its volume level. In either embodiment, the volume levels may be overridden based on the priority of an incoming message. An emergency message might be allowed to generate an audible sound even if normal priority messages are muted. An administrator request that the control system set the volume level for generating alerts in response to receiving high-priority messages, and enable the messenger to override a user-defined volume level to generate the sound. As part of the volume level adjustment, the messenger may be configured to store the volume level used prior to receiving the command message.

In the event that the mobile messenger determines it is not in a location with an auto-volume adjustment (block 1212), the messenger may determine if the currently set volume level was set in response to the mobile messenger being in a different location where the auto-volume adjustment was made (block 1224). If this was the case, the mobile messenger may retrieve a previously used manual volume level setting and adjust the volume level to the previous volume level (block 1228). The volume level remains unchanged in situations where no previously set volume is saved (block 1232).

Mobile messenger devices receive address book information that facilitates contacting parties listed in the address book. Address book information may include any data useful in identifying and communicating with another party via the mobile messenger. Such data may include electronic contact information such as the party's name, relevant phone numbers, email addresses, screen names for instant messaging, and account names in social network applications. Address book information may additionally include biographical information about the party including a picture, age, work title, work location address, and home street address. Using the location information described above, address book information may further include the physical location of the mobile messenger belonging to a party, and the location information may be updated automatically in response to the mobile messenger changing location. An example of a data format for storing address book information in a structured manner is the vCard format.

Figure 13:
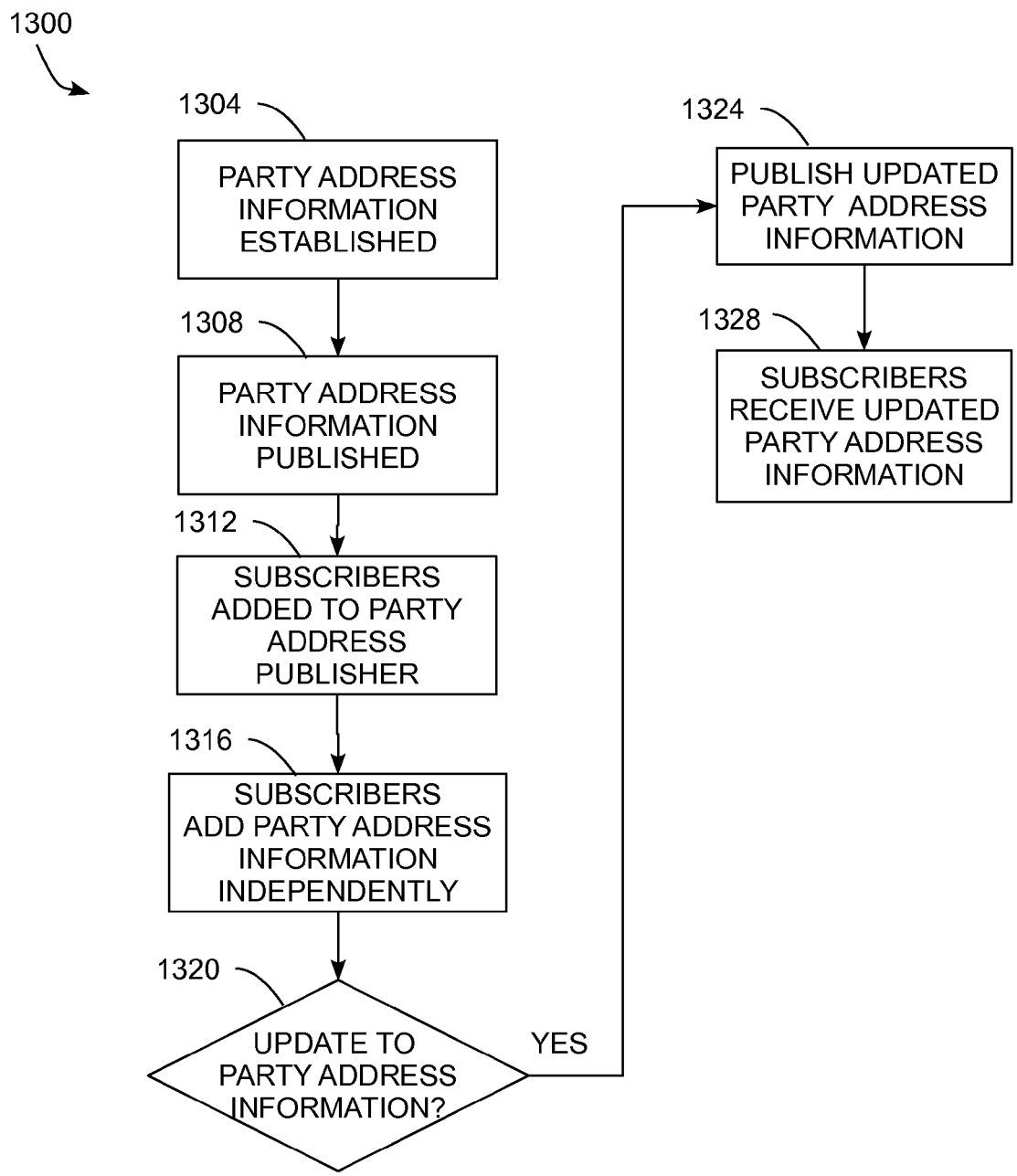
FIG. 13 is a flow diagram of a method for distributing address book information to a plurality of computing devices using a publisher-subscriber network model.

A process 1300 of distributing the address book information is depicted in FIG. 13. Process 1300 begins by establishing an address book entry for a party (block 1304). Each mobile messenger user is a party in process 1300, but a party does not necessarily need to use a mobile messenger to have address information. For example, in a mobile messenger network deployed in a hospital, there may be a number of parties who have address book information established who do not use mobile messenger devices. Examples include third-party doctors who refer patients to the hospital but are not part of the hospital itself, and outside pharmacists who fill prescriptions from doctors in the hospital. While these parties may not use mobile messenger devices, address book information is still established to permit mobile messenger users to communicate with them via the messaging server. Once established, address information for each party is stored in the messaging database in the control system. After establishing the address book information, each address entry is published, enabling one or more subscribers to view the address book information (block 1308). In the embodiment of FIG. 2, messaging server 208 may publish the address book information for one or more subscribing mobile messengers. Process 1300 continues by having mobile messenger users receive address book information by subscribing to one or more address entry publisher nodes (block 1312). When a mobile messenger device is activated, a default set of subscriptions is automatically established for the mobile messenger. The default subscription list may be established by administrators via the administration server, and each mobile messenger may receive a default subscription list tailored to the expected communications patterns of the mobile messenger user. In addition to the default subscription list, a mobile messenger user may manually subscribe to another party whose entry is not in the default subscription list (block 1316). The manually added subscription relationships are stored centrally in the control system, enabling manually added address book subscriptions to be retained in the event that a mobile messenger user changes mobile messenger devices. The administrator may disable manual address book entries and subscriptions to address book lists other than the default address book list via the administrative interface.

In the event that address book information associated with a party is updated (block 1320), the newly updated address book information is re-published by the publishing node (block 1324) and is subsequently received by the subscribing mobile messengers (block 1328). Each mobile messenger user may update his or her own address book information via an address book software interface provided by the mobile messenger. Updates to the address book are then stored in the user database for re-publication by the publishing node. The pubsub mechanism permits an update to an address book entry for a single party in the address book to be distributed to the mobile messengers individually, instead of requiring redistribution of an entire address book when only a limited subset of address book entries have been updated. The update mechanism also sends to the updated address book information to subscribing mobile messengers while refraining from sending the address book to non-subscribers. These features enable efficient distribution of address book information that reduces the volume of information that is sent to the mobile messenger devices.

While the address book information distribution process described above is suited for use with a network of mobile messenger devices, it may be applied to different network computing systems as well. Any network of computing devices sharing address book information may employ the foregoing method to maintain address book information in an efficient manner.

Figure 14:
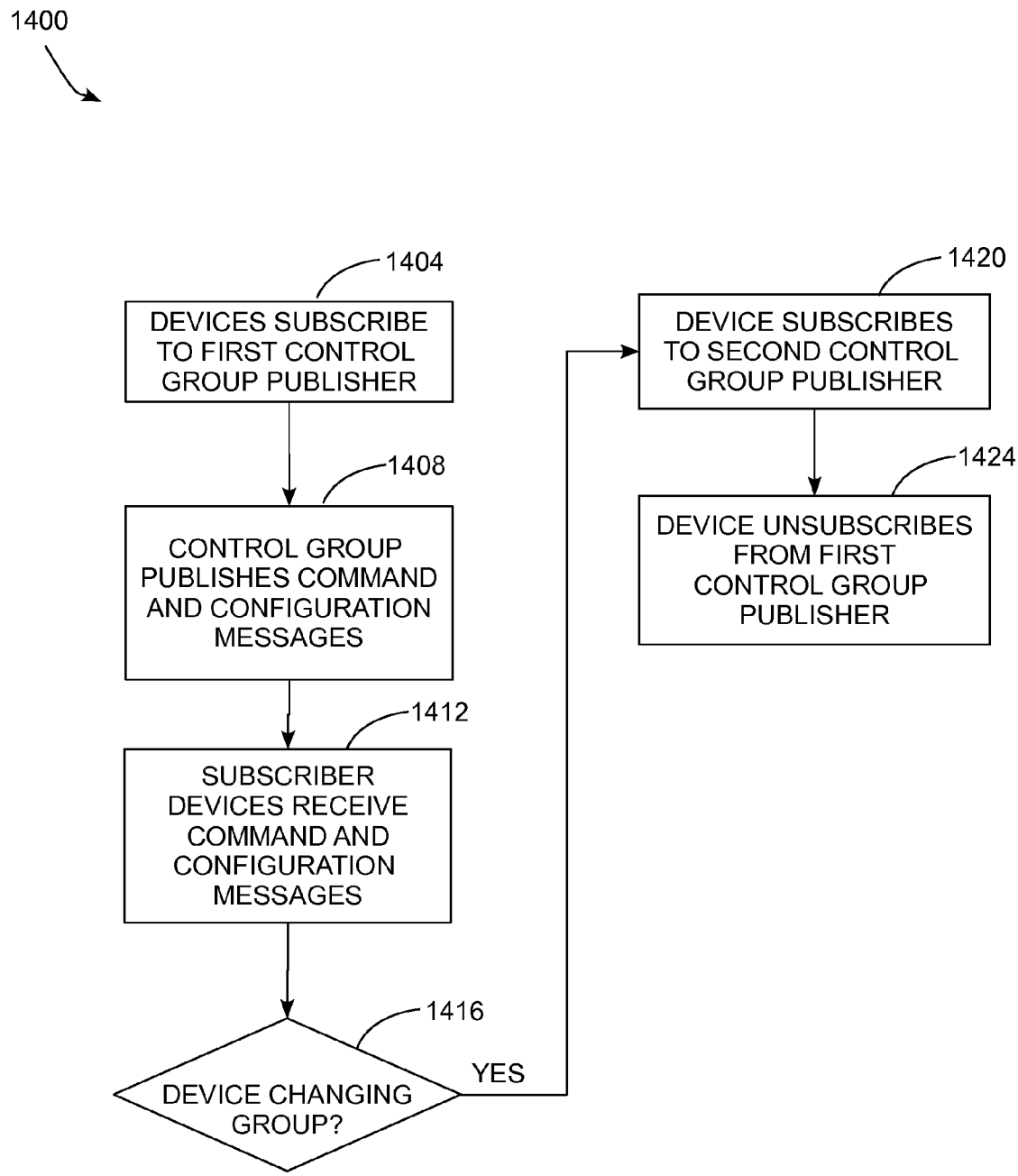
FIG. 14 is a flow diagram of a method for sending control and configuration messages to a plurality of computing devices using a publisher-subscriber network model.

A process 1400 for sending control and configuration messages to mobile messenger devices via a pubsub mechanism is depicted in FIG. 14. Process 1400 begins by subscribing one or more devices, such as mobile messengers, to a single publisher that is associated with a control group (block 1404). A control group is associated with a group of devices that are all configured to receive the same command and configuration data. For example, a subset of mobile messenger devices belonging to doctors in a hospital may belong to a single control group, while a second subset of mobile messenger devices belonging to nurses belongs to a different control group. In one embodiment, the subscription to the command group is established when the mobile messenger device is initially activated. In the exemplary embodiment of FIG. 2, the administration server is configured as the publisher node publishing control and configuration data for one or more control groups.

An administrator sends command and configuration change requests to a control system, such as control system 200. When a new command or configuration message is sent, the publisher node associated with the control group publishes the message (block 1408). Possible configuration messages include updates to listings of approved WLAN access points, and updates to listings of locations where the mobile messenger should deactivate its WWAN transceiver or set an automatic volume level. Command messages include messages instructing mobile messengers to update internal software or firmware code, or to activate or deactivate features or functionality in response to the command message. Various configurable mobile messenger functions include text messaging, voice over Internet Protocol (VoIP) communications, instant messaging services, subscriptions to address book lists, group paging functionality, and various other functions that the mobile messenger may perform. Administrators may use the control system to update configuration information including lists of approved wireless access points, lists of locations where mobile messengers should deactivate cellular transceivers, and lists of locations where the mobile messengers should change the volume level used for audible alerts.

In one mode of operation, command messages and configuration data are prepared by administrators using the administration server and are subsequently published for a corresponding control group. The subscriber mobile messenger devices receive the command and configuration messages via the pubsub mechanism, and take a predetermined action in response to the particular received message (block 1412).

In the event that a mobile messenger device changes from a first control group to a second control group (block 1416), the mobile messenger establishes a subscription to the publishing node for the second control group (block 1420) and removes its subscription from the first control group (1424). At this point, the mobile messenger receives command and configuration updates from the second control group publisher instead of the first control group publisher. Upon changing control groups, the mobile messenger may be initialized with one or more control and configuration messages published by the publisher node of the second control group. The mobile messenger reconfigures itself in response to these messages to match the configuration of other mobile messengers in the same control group.

While the command and configuration process described above is suited for use with a network of mobile messenger devices, it may be applied to different network computing systems as well. Various groups of networked computing devices sharing common control and configuration data may be efficiently managed using process 1400. One suitable example of an alternative system is a Supervisory Control and Data Acquisition (SCADA) system that has a number of network sensor or control devices that are controlled from a centralized server. Process 1400 enables selection and configuration of groups of sensor and control devices in an efficient manner.

Figure 15:
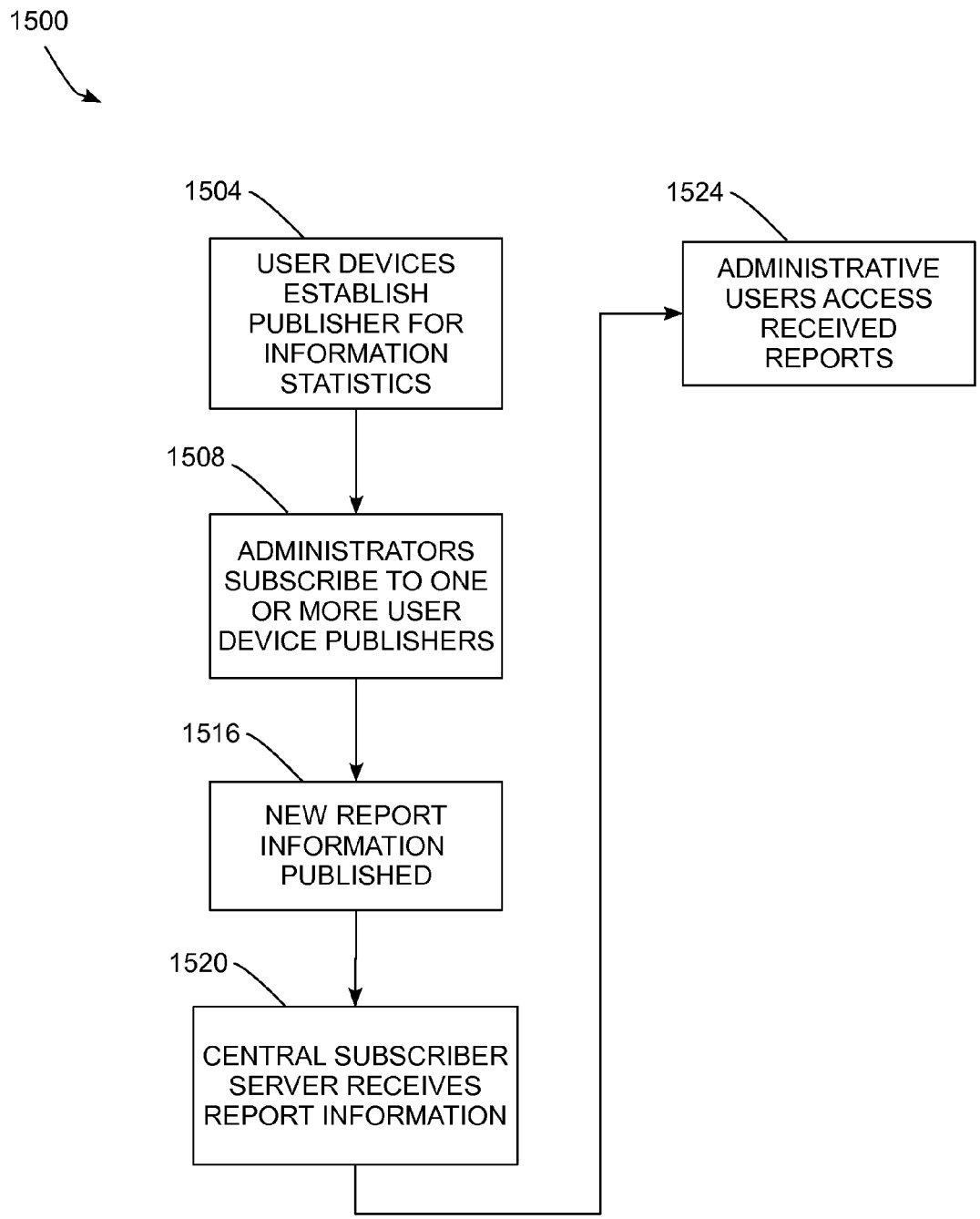
FIG. 15 is a flow diagram of a method employed by a computing device to selectively send reporting information to a plurality of recipients using a publisher-subscriber network model.

A process 1500 for collecting reporting information from a group of mobile messenger devices using a pubsub protocol is depicted in FIG. 15. Reporting information is generated by a mobile messenger during its normal course of operation. The reported information may include device diagnostics including battery life, temperature, and the status and version of operating software. Other reports may detail the mobile messenger's activities, including bandwidth usage for each wireless network that the mobile messenger accesses, and statistics on the number of messages the wireless device has sent or received. The mobile messenger establishes a publisher node for at least one type of report information (block 1504). The mobile messenger may optionally establish multiple publisher nodes dedicated to a specific subset of reporting information having relevance to different subscribers. For example, a publisher node that publishes bandwidth usage is of interest to a subscriber monitoring billing for network usage, while a publisher node publishing battery life information is of interest to a maintenance subscriber monitoring for failing batteries. Different administrative subscribers establish subscriptions to the appropriate publisher nodes in each mobile messenger device (block 1508). In process 1500, each of the mobile messengers acts as a publisher, while one or more subscribers receive published reports using the administration server. Using the embodiment of FIG. 2, the administration server acts as a single subscriber computing device for collecting report data published by each mobile messenger. The administration server may host multiple logical subscribers on a single physical computing device.

Mobile messengers generate report information at periodic intervals, in response to an event detected by the mobile messenger, or in response to a command message received by the mobile messenger. The generated report information is then published by the appropriate publisher node (block 1516), and the subscribing administration server receives the published report (block 1520). Once the subscriber has received published reports, the reports may be stored or organized for access by administrative users (block 1524). In the example embodiment of FIG. 2, the reports generated by a mobile messenger assigned to a particular user may be stored in the user directory database. Administrators may review the report information for a single device, or view consolidated reports corresponding to multiple mobile messengers. The administrators access these reports via the administrative interface hosted on the administration server. Thus, the administration server acts as a subscriber, while individual administrators access some or all of the stored reports instead of directly subscribing to individual mobile messenger devices.

While the reporting information collection process described above is suited for use with a network of mobile messenger devices, it may be applied to different network computing systems as well. A system including a centralized control enabling administrators to view diagnostic and status information of multiple networked computing devices may employ process 1500. Some examples of these systems include the aforementioned SCADA systems. Another example includes centrally managed enterprise computing networks having networked computing devices including computer workstations and networked printers.

A control system, such as control system 200, collects the report data that the subscribing administrative server receives. Different administrators may have access to the report data through the administrator interface portal. The portal may display unedited report data for one or more mobile messenger devices, or generate aggregate data including graphs and statistics that provide information on the operation of the mobile messengers, wide area network, and local area networks. Administrators may access the administrator interface portal in the control system to review reports of warning and error messages that one or more mobile messengers generate during operation. These errors may indicate hardware faults in certain mobile messenger units, or may indicate wider problems with one or more wireless networks including weak signals or interference with a wireless access point. The reports may also include records of maintenance or remedial measures taken to resolve reported problems.

Reports directed to the operating condition of networks that support the mobile messengers include graphs showing outages or downtime of various wireless access points and wireless towers, graphs of bandwidth usage and network capacity utilization, and graphs of the storage capacity usage of databases including the message database and user directory database. The mobile messengers may report average network latency and response times to generate network performance metrics that measure the average delivery time for messages on the network and the average delay between when the control system publishes various data, including address book updates, and when subscribing mobile messengers receive the published data.

The administrator may access the administrative interface to view accounting data including bandwidth usage statistics for each mobile messenger, including the amount of data that each mobile messenger sends and receives using wide area networks and local area networks in various locations. Since many wide area networks charge fees that are proportional to network utilization, the accounting data may identify locations where WLAN access points reduce operating costs. The administrators may also disable certain functions for mobile messenger users that exceed predetermined data usage caps on wide area networks. For example, a mobile messenger user may have a data usage cap for sending and receiving data via the WWAN of 10 megabytes per month. The administrator may publish a control message that disables sending and receiving VoIP messages using the WWAN upon exceeding the cap, but still enables sending and receiving of VoIP messages via the WLAN.

Another administrator report feature enables the administrators to view the locations of different mobile messenger devices on a map. The mobile messenger devices report various forms of location information that may include positioning data from a global positioning system, or may include location data generated from one or more WLAN and WWAN transceivers having known locations. The portal may display the locations for all mobile messengers or for a select subset of mobile messengers superimposed on a map. The map may cover a larger geographic area, such as a city or state, or may depict an individual building, such as an office building. When only approximate location data are available for a mobile messenger, the map may indicate that the location is an approximation and include a confidence circle or other estimate of the accuracy of the location. When a mobile messenger is not in communication with the control system, the portal may display the last known location of the mobile messenger on the map.

In addition to report information collected directly from mobile messenger devices, various auditing devices may also test network performance and generate report data. These devices may employ wireless transceivers that are similar to the mobile messengers, but send automated test messages and reports to the control system instead of sending communications messages. Other auditing systems include software systems that collect accounting and performance data from network components, such as wireless access points. Mobile messenger devices and automated auditing systems generate report data without requiring manual control from a mobile messenger user. A mobile messenger may defer transmission of report data to the control system for storage and analysis until there is a period of low network utilization. In some embodiments, mobile messengers only send report data to the control system using WLAN networks to reduce the bandwidth usage and costs incurred from utilizing WWAN networks.

Figure 17:
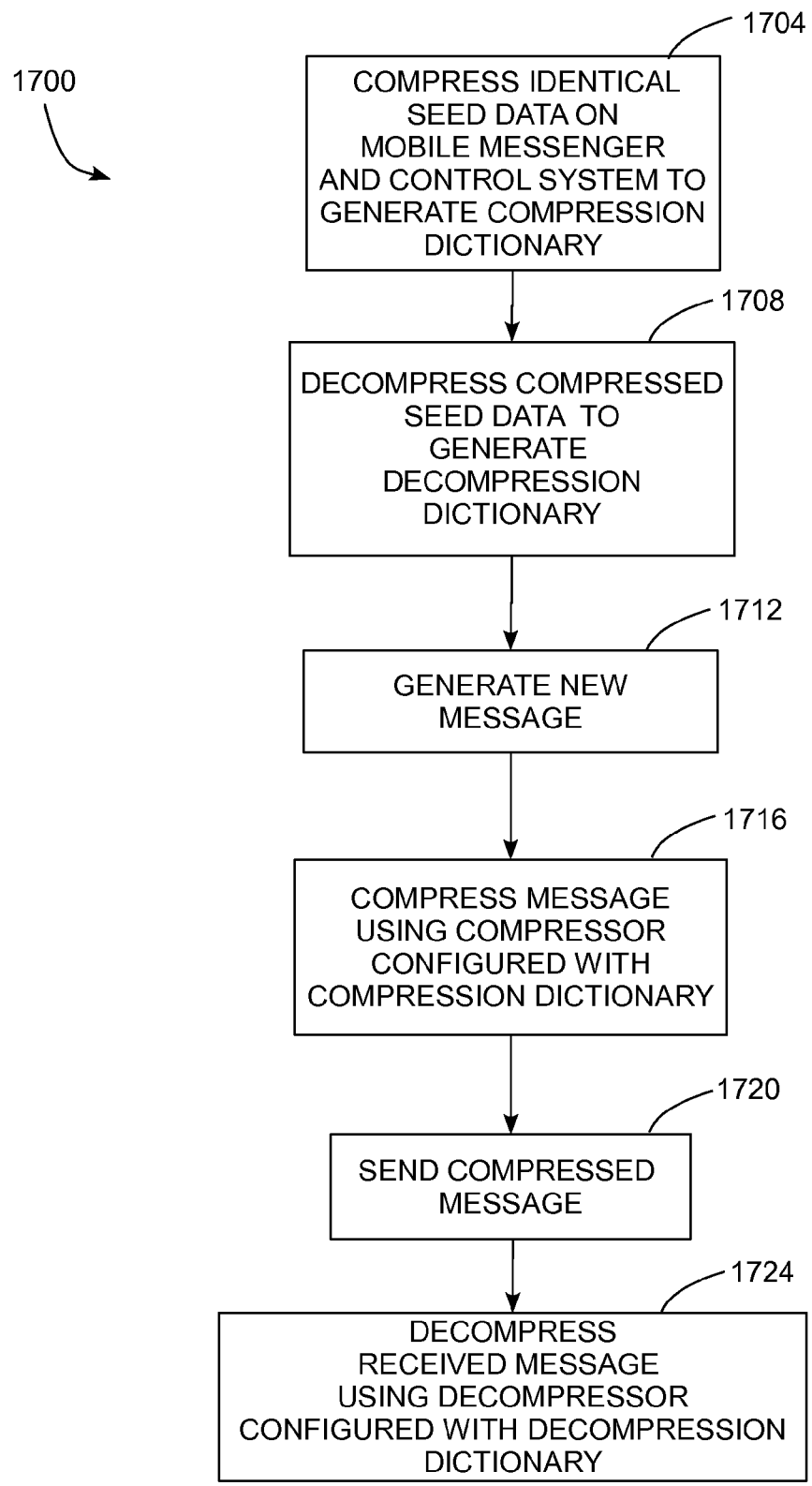
FIG. 17 is a flow diagram of a method for sending compressed data between multiple computing devices.

FIG. 17 depicts a process 1700 for compression of data sent and received by the control system and mobile messengers during the processes depicted above in FIG. 5-FIG. 16. Both the control system and mobile messenger devices include a compressor and decompressor for compressing and decompressing, respectively, data such as communications messages, authentication data, and control messages. The compressor generates compressed data that store the same contents as the original uncompressed data using fewer bytes than the original data, and the decompressor may generate the original data from the compressed data. Various block compression implementations, including software and hardware that implement the DEFLATE and LZW block compression algorithms, may be used to compress data prior to sending the data via WLAN and WWAN networks. After the compressed data are sent, a corresponding decompressor generates the original message data from the compressed data. The level of compression offered by the block compressor improves when a relatively large amount of data having similar statistical properties, such as entropy and symbol frequency, are provided to the compressor. The compressor generates an internal dictionary from the previously compressed data to improve the compression of subsequently received data having similar statistical properties. Various operations of the mobile messengers and control system, however, involve sending multiple smaller data messages that are too short to enable the compressor to generate an internal dictionary for efficient compression. Process 1700 provides a method for efficient compression and decompression of the shorter messages.

In process 1700, the control system and each of the mobile messengers each compress an identical set of seed data using a predetermined compression and decompression scheme (block 1704). As used herein, the term "seed data" refers to a predetermined set of data that are suitable for compression by the compressor and decompression by the decompressor. Seed data for the compressor may include samples of uncompressed message data. The compressor may generate seed data for the decompressor by compressing the predetermined seed data. Identical seed data are stored in data storage devices within the control system and the mobile messengers, to enable compressors and decompressors in separate computing devices to share the same internal dictionaries generated from the seed data. The control system and each of the mobile messengers include a compressor and decompressor. The compressor for the control system and the decompressor for each mobile messenger share a first set of identical seed data, and the compressor for the mobile messengers and the decompressor for the control system share a second set of identical seed data. In one embodiment, the first set of seed data and second set of seed data may be the same. In an alternative embodiment, the first and second sets of seed data are different. The first set of seed data are selected with reference to messages that the control system sends to the mobile messengers, and the second set of seed data are selected to with reference to the messages that the mobile messengers send to the control system. The compressor in each mobile messenger may include an individual set of seed data adapted for the profile of messages used in the mobile messenger, and the control system may store corresponding seed data for multiple mobile messenger devices.

The size of each set of seed data is selected to be sufficient to enable the compressor to generate an internal dictionary to optimize subsequent data that have statistics that are similar to the seed data. The sizes of seed data may change during operation with one embodiment providing an initial 32 Kilobytes of seed data that may grow to a maximum configured size of 64 Kilobytes. In one embodiment, the contents of each message compressed using a compressor are appended to the seed data used to generate dictionaries in the compressor and corresponding decompressor. The seed data may grow from the initial size until seed data reach the maximum configured size. In one embodiment, the seed data grows until the maximum configured size and remains constant thereafter. In another embodiment, the seed data are updated with the contents of each new message, and a corresponding set of the oldest data in the seed data set are removed to maintain the size of the seed data.

The compressed seed data are provided to a decompressor to generate an internal dictionary used for decompression (block 1708). The decompression may be optional in some embodiments where compressor and decompressor share the same internal dictionary and internal state. The internal dictionaries may be cached in a memory to enable the compressor and decompressor to operate on multiple messages without processing the seed data multiple times. The hardware and software embodiments of the compressor may be different between mobile messengers and the control system provided that the implementations produce compatible compressed and decompressed data.

During operation, the control system or mobile messenger generates data for a new message (block 1712). The new data are then provided to the compressor that is configured with the internal dictionary generated from the seed data. The compressor generates compressed data that correspond to the new data message using the previously generated internal dictionary (block 1716). This internal dictionary enables a higher compression ratio and smaller size for the compressed data when compared to compressing the message data without using the seed data. The compressed data are then sent to the recipient device via a WLAN or WWAN (block 1720). Once received, the recipient device decompresses the compressed message using a decompressor that has an internal dictionary generated using the same seed data used prior to compressing the data (block 1724). Thus, the decompressor is configured to decompress the compressed data corresponding to the new message.

Process 1700 enables compression of shorter data messages with improved compression ratios to reduce the total amount of message data sent via WLAN and WWAN networks. The improved compression reduces utilization and congestion of the wireless networks and reduces operating costs for wireless networks that charge based on data usage. The selection of seed data mimics the expected statistical properties of data sent and received by the control system and mobile messenger devices. For example, in systems using XML based communications protocols, the seed data may be a string including sample XML messages that match the format of communications messages and command messages.

The mobile messenger devices and central control system 200 of FIG. 2 may be adapted to perform one or more of processes described above. Each of mobile messengers 232A-232D may store a subscriber configuration in memory instructing each mobile messenger to subscribe to one or more address book publisher nodes and to a single control group publisher node. Using the example pubsub scheme of the Publish-Subscribe extension to the XMPP protocol, each mobile messenger further stores a uniform resource locator (URL) of each publisher node in its memory. The mobile messengers then receive notification of published address book entries as well as configuration and command messages via data networks such as WAN 220 or LAN 222. Control system 200 acts as the publisher for address book and control group information. Messaging server 208 may be configured to read user address information stored in user database 212 and publish the information, including publishing updates to address book entries when address information changes. Administration server 204 receives commands sent via the administration interface and is configured to act at the publisher node for one or more command groups. The command group publisher nodes publish command and configuration information that is received by the targeted subscriber mobile messengers via WAN 220 or LAN 222. For reporting process 1500, mobile messengers 232A-232D are configured to be publishers, providing device statistics from hardware sensors and the memory in each mobile messenger. Administration server 204 is configured to subscribe to the publisher nodes of each mobile messenger. This configuration may include extracting appropriate publisher URLs for each device from hardware information stored in user database 212. Administration server 204 is further configured to store published reporting data received via its subscriptions in user database 212, and to provide an interface for administrators to view the information via the administrator interface discussed above.

One advantage of the mobile messenger and control system described above is the ability to reduce substantially the reliance of a wireless device on cellular networks or services supported by cellular networks. For example, an application program that implements the functionality described above may be developed for a cellular phone having 3G or 4G data communication capability. As long as the cellular phone also includes a wireless transceiver for 802.11 networks, the application program, once installed, may operate in response to detection of a 802.11 network access point or a command message received from a central command site to disable the WWAN transceiver, but still implement the 3G or 4G data communication services as well as the voice communication services through the 802.11 network transceiver. Because 802.11 network access is frequently provided at no cost to users, the device is still able to provide the higher level data and voice communication functionality without causing the user to incur the higher cellular network charge rates. Thus, smartphones or cellular phones with such an installed application program may now be used as pager devices without requiring the enterprise, such as a hospital or police department, to pay higher monthly service plans as required for devices that primarily rely on cellular networks or services provided through cellular networks. A cellular service may even provide cellular phones or smartphones so configured to enterprises with lower cost service plans. In this manner, the functionality of cellular phones and smartphones may be provided to enterprises at rates that enable the devices to replace pagers without adversely impacting the bandwidth of the cellular services for other users who require relatively constant cellular network access.

While the system and method for device control have been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. Therefore, the system and method described above in their broadest aspects are not limited to the specific details, implementations, or illustrative examples shown and described. Accordingly, departures may be made from such details without departing from the spirit or scope of applicant's disclosed system and method.

We claim:

1. A system for managing mobile electronic communications devices comprising:
   a user directory database configured to hold authentication data associated with at least one user;
   an authentication authority communicatively connected to the user directory database, the authentication authority configured to:
      accept or deny authentication data for a user received from at least one mobile electronic communications device;
      to store status information corresponding to authenticated users in the user directory database; and
      to store an association between each authenticated user and each mobile electronic device that sent authentication data for an authenticated user in the user directory database;
   an administration server configured to:
      send and receive command messages with at least one mobile electronic communications device;
      identify that a second mobile electronic communications device sending valid authentication data for a user is different from a first mobile electronic communications device associated with the user in the user directory database; and
      send a command message to the first mobile electronic communications device in response to the second mobile electronic communications device sending valid authentication data, the first mobile electronic communications device being configured to erase at least a portion of data stored in a memory in the first mobile electronic communications device in response to receiving the command message;
   a messaging server configured to send and receive communications messages with at least one mobile electronic communications device; and
   the authentication authority, administration server, and messaging server being configured to send and receive data via a data communications network.

2. The system of claim 1, the administration server being further configured to:
   send a command message having an alarm command to a mobile electronic communications device.

3. The system of claim 2, the administration service being further configured to:
   send the alarm command with an identification of a volume level for an audible alarm.

4. The system of claim 1, the administration server being further configured to:
   send at least one list containing at least one location identifier to a mobile electronic communications device.

5. The system of claim 4, the administration server being further configured to:
   send the at least one list with at least one location identifier associated with a location in which the mobile electronic communications device is configured to operate with an automatically adjusted volume setting.

6. The system of claim 4, the administration server being further configured to:
   send the at least one list with at least one location identifier associated with a location in which the mobile electronic communications device is configured to deactivate a wireless transceiver.

7. The system of claim 1, the user directory database being further configured to include:
   a plurality of paging group records, each paging group record identifying a plurality of users in the user directory database; and
   the messaging server being further configured to send a communications message to each user identified by the paging group record in response to the communications message identifying the paging group.

8. The system of claim 7, the messaging server being further configured to:
   store a number of acknowledgement messages generated in response to the communications message that identifies the paging group.

9. The system of claim 1 further comprising:
   a non-volatile memory;
   a compressor, the compressor configured to read seed data from the non-volatile memory, to generate compressed seed data, and to compress at least one other set of uncompressed data for transmission by at least one of the messaging server, administration server, and authentication authority after compressing the seed data; and
   a decompressor, the decompressor being configured to read the compressed seed data generated by the compressor, to decompress the compressed seed data, and to decompress at least one other set of compressed data received by the at least one of the messaging server, administration server, and authentication authority after decompressing the seed data.

10. A system for managing mobile electronic communications devices comprising:
    a user directory database configured to hold authentication data associated with at least one user;
    an authentication authority communicatively connected to the user directory database, the authentication authority configured to:
       accept or deny authentication data for a user received from at least one mobile electronic communications device;
       to store status information corresponding to authenticated users in the user directory database; and
       to store an association between each authenticated user and each mobile electronic device that sent authentication data for an authenticated user in the user directory database;
    an administration server configured to send and receive command messages with at least one mobile electronic communications device;
    a message archive database;
    a messaging server configured to:
       send and receive communications messages with at least one mobile electronic communications device,
       retain copies of sent and received communications messages in the message archive database;
       send at least one retained communications message held in the message archive database to at least one authenticated mobile electronic communications device;
       maintain a record of an acknowledgment message sent from a receiving mobile electronic communications device, the acknowledgement message acknowledging receipt of a communications message; and
       maintain a record of a second acknowledgment message sent from a displaying mobile electronic communications device, the second acknowledgment message including an acknowledgment that the mobile electronic communications device displayed a received communications message.

11. The system of claim 10, the messaging server being further configured to:

send at least a portion of data associated with a user in the user directory database to an authenticated mobile electronic communications device providing authentication data corresponding to the user.

12. The system of claim 10, the administration server and messaging server being further configured to:

identify a second mobile electronic communications device sending valid authentication data for a user, the second mobile electronic communications device being different from a first mobile electronic communications device associated with the user in the user directory database;

send at least a portion of the copies of sent and received communications messages retained in the message archive database to the second mobile electronic communications device; and send a command message to the first mobile electronic communications device in response to the second mobile electronic communications device sending valid authentication data.

13. The system of claim 12, the first mobile electronic communications device being configured to:

erase at least a portion of data stored in a memory in the first mobile electronic communications device in response to receiving the command message.

14. The system of claim 10, the administration server being further configured to:

provide access to at least one administrator, the administration server allowing the at least one administrator to read:

at least a portion of copies of communications messages held in the message archive database;

at least a portion of records of acknowledgment messages that include acknowledgments that a mobile electronic communications device received a communications message;

at least a portion of records of second acknowledgment messages that include acknowledgments that a mobile electronic communications device displayed a received communications message.

\* \* \* \* \*